United States Patent
Melkild

(10) Patent No.: US 12,229,576 B2
(45) Date of Patent: Feb. 18, 2025

(54) LIFECYCLE MANAGEMENT OF A VNFC INCLUDED IN A MULTI-VNFC VDU

(71) Applicant: OPEN INVENTION NETWORK LLC, Durham, NC (US)

(72) Inventor: Keith William Melkild, Allen, TX (US)

(73) Assignee: OPEN INVENTION NETWORK LLC NC, Durham, NC (US)

( * ) Notice: Subject to any disclaimer, the term of this patent is extended or adjusted under 35 U.S.C. 154(b) by 981 days.

(21) Appl. No.: 17/230,992

(22) Filed: Apr. 14, 2021

(65) Prior Publication Data
US 2021/0326162 A1 Oct. 21, 2021

Related U.S. Application Data

(60) Provisional application No. 63/010,665, filed on Apr. 15, 2020.

(51) Int. Cl.
*G06F 9/455* (2018.01)
*G06F 9/48* (2006.01)
*G06F 9/50* (2006.01)
*H04L 41/0806* (2022.01)
*H04L 41/0895* (2022.01)
*H04L 41/342* (2022.01)

(52) U.S. Cl.
CPC ...... *G06F 9/45558* (2013.01); *G06F 9/45516* (2013.01); *G06F 9/485* (2013.01); *G06F 9/45512* (2013.01); *G06F 2009/45595* (2013.01); *G06F 9/5077* (2013.01); *H04L 41/0806* (2013.01); *H04L 41/0895* (2022.05); *H04L 41/342* (2022.05)

(58) Field of Classification Search
CPC ............ G06F 9/45558; G06F 9/45516; G06F 9/485; G06F 2009/45595; G06F 9/5077; G06F 9/45512; H04L 41/0806; H04L 41/0895; H04L 41/342
See application file for complete search history.

(56) References Cited

U.S. PATENT DOCUMENTS

| | | | | |
|---|---|---|---|---|
| 2017/0006083 | A1* | 1/2017 | McDonnell | H04L 41/12 |
| 2018/0159731 | A1* | 6/2018 | Murthy | H04L 49/90 |
| 2019/0004865 | A1* | 1/2019 | Ivanov | G06F 9/44536 |
| 2019/0196837 | A1* | 6/2019 | Gagnon | G06F 9/45558 |
| 2019/0273668 | A1* | 9/2019 | Xia | H04L 41/14 |

OTHER PUBLICATIONS

Bernini et al. "SELFNET Virtual Network Functions Manager: A Common Approach for Lifecycle Management of NFV Applications" (2016) (Year: 2016).*

* cited by examiner

*Primary Examiner* — Michael W Ayers

(57) ABSTRACT

An example operation includes one or more of receiving a VNFC LCM request including a VNFC instance (VNFCI) and an LCM operation to be performed, retrieving one or more VNFCI datum, determining a target OS installation of the VNFCI, establishing a connection to the target OS installation, checking for the presence of a VNFC specific LCM script for the LCM operation to be performed, constructing a VNFC specific LCM command that calls the VNFC specific LCM script and which specifies the VNFCI, executing the VNFC specific LCM command, normalizing a response code, and sending a response to the VNFC LCM request.

20 Claims, 14 Drawing Sheets

```
500

502 ——— !--- VNF.yaml (VNFD)
504 ——— !--- VNF.mf (manifest)
506 ——— !--- VNF.cert (signing certificate)
508 ——— !--- ChangeLog.txt
510 ——— !--- Licenses
512 ———————————— !--- file(s)
514 ——— !---- Artifacts
516 ———————————— !----- scripts
518 ———————————————————— !--- file(s)
520 ———————————— !----- vdus
522 ———————————————————— !----- vduX
524 ———————————————————————————— !----- vcImage
526 ———————————————————————————————————— !--- file(s)
528 ———————————————————————————— !----- scripts
530 ———————————————————————————————————— !--- file(s)
532 ———————————————————————————— !----- vnfc
534 ———————————————————————————————————— !----- vnfcY
536 ———————————————————————————————————————————— !----- scripts
538 ———————————————————————————————————————————————————— !--- file(s)
540 ———————————————————————————————————————————— !----- swLoad
542 ———————————————————————————————————————————————————— !--- file(s)
```

FIG. 5

700

LIFECYCLE MANAGEMENT OF A VNFC INCLUDED IN A MULTI-VNFC VDU

FIELD OF THE INVENTION

This application generally relates to monitoring of Virtual Network Functions (VNFs) in a system employing a Network Function Virtualization (NFV) architecture. More specifically, the application relates to monitoring a VNFC included in a single Virtual Deployment Unit (VDU) with multiple Virtual Network Function Components (VNFCs).

BACKGROUND

Network Function Virtualization (NFV) based architectures offer a way to design and deploy telecommunication network services. In the past, the functions that make up these services have been tightly coupled to the proprietary hardware on which they execute. NFV based architectures decouple the software implementation of these functions from the underlying infrastructure. The software typically runs in virtual machines or containers, under the control of a hypervisor or operating system which run on commercial off-the-shelf (COTS) servers. This approach has the promise of significant reductions in capital and operational expenses for service providers as custom hardware is no longer required and scaling is provided through additional software deployments, not a provisioning of new physical equipment.

The European Telecommunications Standard Institute (ETSI) network functions virtualization (NFV) industry specification group (ISG) has defined a reference NFV architecture. ETSI took an approach that enables existing management infrastructure such as Operational Support Systems (OSS)/Business Support Systems (BSS) and Element Management Systems (EMS) to remain in place. The standard is focused on getting Network Services (NSs) and Virtual Network Functions (VNFs) deployed on a cloud-based infrastructure, while leaving traditional Fault, Configuration, Accounting, Performance and Security (FCAPS) to be managed by EMS and OSS/BSS. Even with this focus, the details of many important aspects of the functionality are not specified.

SUMMARY

One example embodiment provides a method that includes one or more of receiving a VNFC LCM request including a VNFC instance (VNFCI) and an LCM operation to be performed, retrieving one or more VNFCI datum, determining a target OS installation of the VNFCI, establishing a connection to the target OS installation, checking for the presence of a VNFC specific LCM script for the LCM operation to be performed, constructing a VNFC specific LCM command that calls the VNFC specific LCM script and which specifies the VNFCI, executing the VNFC specific LCM command, normalizing a response code, and sending a response to the VNFC LCM request.

Another example embodiment provides a system that includes a memory communicably coupled to a process, wherein the processor is configured to perform one or more of receive a VNFC LCM request that includes a VNFC instance (VNFCI) and an LCM operation to be performed, retrieve one or more VNFCI datum, determine a target OS installation of the VNFCI, establish a connection to the target OS installation, check for the presence of a VNFC specific LCM script for the LCM operation to be performed, construct a VNFC specific LCM command that calls the VNFC specific LCM script and which specifies the VNFCI, execute the VNFC specific LCM command, normalize a response code, and send a response to the VNFC LCM request.

A further example embodiment provides a non-transitory computer readable medium comprising instructions, that when read by a processor, cause the processor to perform one or more of receiving a VNFC LCM request including a VNFC instance (VNFCI) and an LCM operation to be performed, retrieving one or more VNFCI datum, determining a target OS installation of the VNFCI, establishing a connection to the target OS installation, checking for the presence of a VNFC specific LCM script for the LCM operation to be performed, constructing a VNFC specific LCM command that calls the VNFC specific LCM script and which specifies the VNFCI, executing the VNFC specific LCM command, normalizing a response code, and sending a response to the VNFC LCM request.

BRIEF DESCRIPTION OF DRAWINGS

FIG. 5 is a diagram of an embodiment of a VNF package archive in accordance with one or more embodiments.

DETAILED DESCRIPTION

Figure 1:
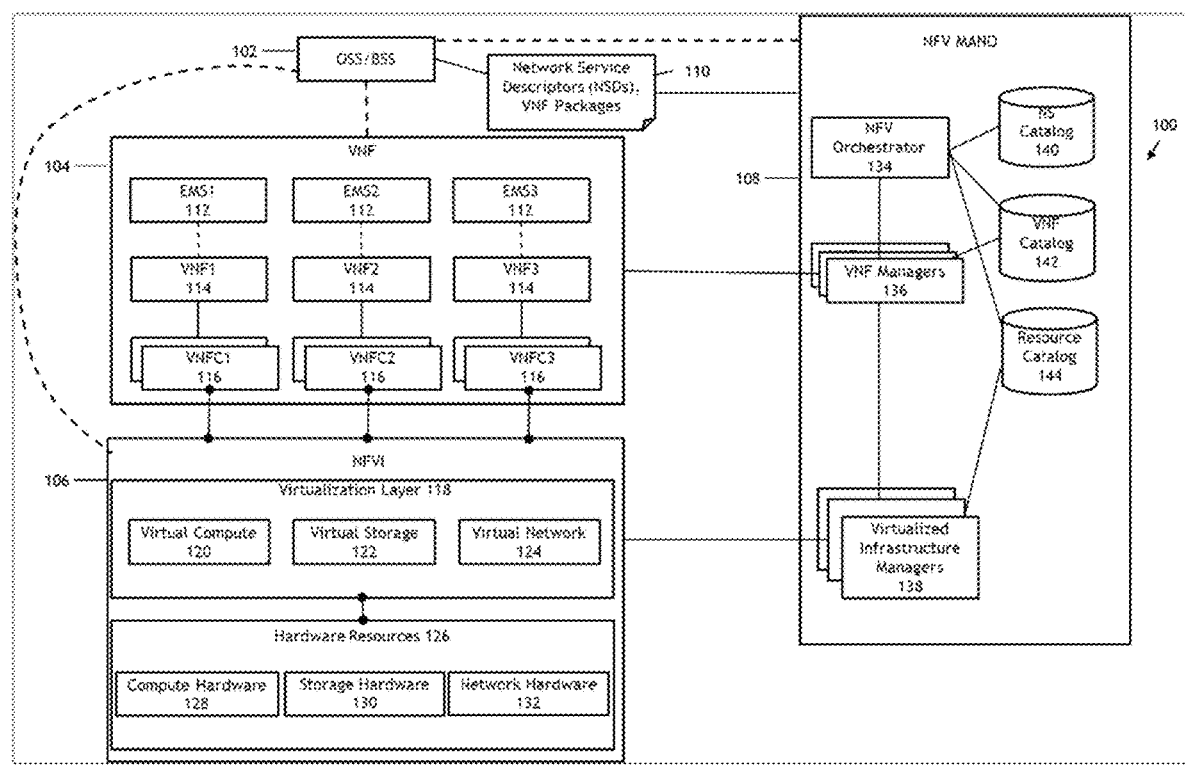
FIG. 1 is a diagram of an embodiment of a network function virtualization framework in accordance with one or more embodiments.

It will be readily understood that the instant components and/or steps, as generally described and illustrated in the figures herein, may be arranged and designed in a wide variety of different configurations. Thus, the following detailed description of the embodiments of at least one of a method, system, component and non-transitory computer readable medium, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Disclosed herein are various embodiments for implementing and/or utilizing lifecycle management of VNF components. A VNF is the implementation of a network function that can be deployed in an NFV architecture. VNFs can be viewed as service building blocks which may be used by one or more Network Services (NSs). Examples of VNFs include, but are not limited to, firewall, application acceleration, Deep Packet Inspection (DPI), Session Initiation Protocol (SIP) user agent, and Network Address Translation (NAT).

Each VNF specifies its deployment and operational behavior in a deployment template known as a VNF Descriptor (VNFD). This descriptor along with the VNF software bundle are delivered to an NFV management system in an archive known as a VNF Package. A VNF may be implemented using one or more VNF Components (VNFCs). A VNFC is an internal component of a VNF that provides a subset of that VNF's functionality. The main characteristic of a VNFC is that it maps n:1 with a Virtualized Container (VC) when the function is deployed. The term Virtualized Container (VC) is used herein to describe a Virtual Machine (VM) or operating system container. VNFCs are in turn made up of one or more software modules. Each module may spawn one or more operating system processes when deployed.

A VNF instance (VNFI) is a run-time instantiation of the VNF software resulting from completing the instantiation of its VNFCs and the connectivity between them. As multiple instances of a VNF can exist in the same domain, the terms VNF and VNF Instance (VNFI) may be used interchangeably herein. Similarly, VNFC instance (VNFCI) is a run-time instantiation of a VNFC deployed in a particular VC. It has a lifecycle dependency with its parent VNFI. As multiple instances of a VNFC can exist in the same domain, the terms VNFC and VNFC Instance (VNFCI) may also be used interchangeably herein.

FIG. 1 is a diagram of a network function virtualization framework 100 for implementing NFV in accordance with one or more embodiments of the present application. The NFV framework 100 comprises an operating support system (OSS) /business support system (BSS) module 102, a VNF module 104, a network function virtualization infrastructure (NFVI) model 106, and an NFV management and orchestration (MANO) module 108. A module may be a virtual element, a physical network element or embedded in a physical network element and may consist of hardware, software, firmware and/or a combination of one or more of hardware, software, and firmware. The OSS/BSS module 102 is configured to support management functions such as network inventory, service provisioning, networking configurations, and fault management. Further, the OSS/BSS module 102 is configured to support end-to-end telecommunication services. The OSS/BSS module 102 is configured to interact with the VNF module 104, the NFVI module 106 and the NFV MANO module 108. The VNF module 104 may comprise element management systems (EMSs) 112, VNFs 114 and VNFCs 116. The EMSs 112 may be applicable to specific VNFs and are configured to manage one or more VNFs 114 which may be composed of one or more VNFCs 116.

In one embodiment, the VNF module 104 may correspond with a network node in a system and may be free from hardware dependency. The NFVI module 106 is configured to provide virtual compute, storage and network resources to support the execution of the VNFs. The NFVI module 106 may comprise COTS hardware, accelerator components where necessary and/or a software layer which virtualizes and abstracts underlying hardware. For example, the NFVI module 106 may comprise one or more of a virtual compute module 120, a virtual storage module 122, a virtual networking module 124 and a virtualization layer 118. The virtualization layer 118 may be operably coupled to hardware resources 126 including, but not limited to compute hardware 128, storage hardware 130 and network hardware 132. The NFV MANO module 108 is configured to orchestrate and to manage physical and/or software resources that support the infrastructure virtualization. The NFV MANO module 108 is configured to implement virtualization specific management tasks for the NFV framework 100. The NFV MANO module 108 is supplied a set of VNF packages 110 each of which includes but is not limited to a VNF Descriptor (VNFD) and a VNF software bundle. This VNFD is a set of metadata that describes VNF to VNFC structure and underlying infrastructure requirements. Additionally, the MANO module 108 may be supplied a set of Network Service Descriptors (NSDs) 110, each of which is a set of metadata that describe the relationship between services, VNFs and any underlying infrastructure requirements. The NSDs and VNF packages 110 are owned by and stored in the OSS/BSS 102, but are used to interwork with the MANO module 108.

In one embodiment, the NFV MANO module comprises an NFV orchestrator (NFVO) module 134, a VNF manager (VNFM) 136, and a virtualized infrastructure manager (VIM) 138. The NFVO 134, the VNFM 136 and the VIM 138 are configured to interact with each other. Further, the VNFM 136 may be configured to interact with and to manage the VNF module 104 and the VIM 138 may be configured to interact with and manage the NFVI module 106. The orchestrator module 134 is responsible for the lifecycle management of network services. Supported lifecycle operations include one or more of instantiating, scaling, updating and terminating network services. The VNFM 136 is responsible for the lifecycle management for a set of VNFs 114 and all of their components (VNFCs) 116. Supported lifecycle operations include one or more of instantiating, scaling, updating and terminating VNFs. A VNFM may manage one or more types of VNFs 114. The VIM 138 is responsible for controlling and managing NFVI 106 compute, storage and network resources usually within an operator's infrastructure domain. Additionally, VIMs 138 may be partitioned based on an operator's Points of Presence (PoPs), i.e. physical locations. The network service (NS) catalog 140, stores the network services which are managed by the orchestrator module 134. Each stored service may include, but is not limited to, the NSD 110 that defines the service. The VNF catalog 142 stores the VNFs which are used to build network services. Each stored VNF may include, but is not limited to, the VNF package 110 that includes the VNFD and VNF software bundle. This catalog is accessed by both the NFVO 134 and VNFM Managers 136. The resource catalog 144 stores the list of virtual and physical infrastructure resources in the NFVI 106 including the mapping between them. This catalog is accessed by both the NFVO 134 and the VIMs 138.

Figure 2:
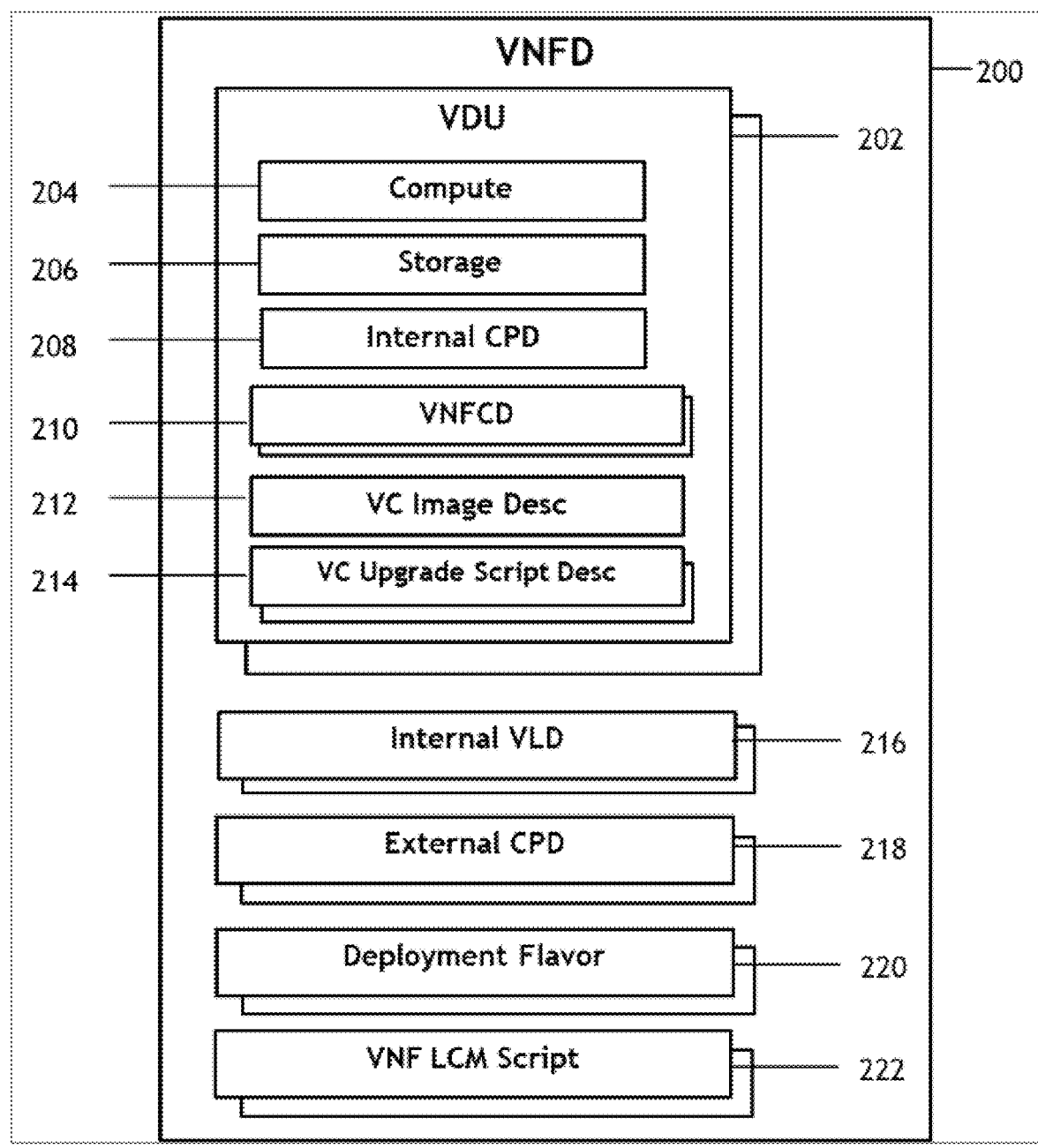
FIG. 2 is a diagram of an embodiment of a VNF descriptor in accordance with one or more embodiments.

FIG. 2 illustrates a VNF Descriptor (VNFD) 200 which defines the VNF properties and requirements for onboarding and management of a VNF in an NFV system 100 (See FIG. 1) in accordance with one or more embodiments of the present application. Each VNFD 200 includes VNF identification attributes including a globally unique id, a provider identifier, a product identifier and a software version. Additionally, a VNFD includes one or more Virtual Deployment Units (VDUs) 202. Each VDU 202 may include one or more VNFCs 116 (See FIG. 1). Given this, each VDU 202 specifies the Compute 204 and Storage 206 resource requirements for running the included VNFCs. Additionally, the VDU 202 includes internal network Connection Point Descriptors (CPD) 208 which describe requirements for networking ports to be used for VNFC 114 (See FIG. 1) to VNFC communication. In accordance with one or more embodiments of the present application, each VDU includes one or more VNFC Descriptors (VNFCDs) 210 that describe the VNFCs that execute inside the VC instantiated based on this VDU 202. Further, a VC image descriptor 212 is included in the VDU 202. This image descriptor includes a reference to the location of the VC image required to install the VC that hosts the VNFCs 114 (See FIG. 1) described by the VNFCDs 210. Typically, the location reference is internal to the VNF Package 110 (See FIG. 1), but the reference may also refer to an external source. Additionally, in some embodiments, the VDU contains one or more VC Upgrade Script Descriptors 214. These scripts, which enable upgrade of the non-VNFC components of the VC, may be included if the VNFCs 116 (See FIG. 1) defined by the VNFCDs 210 are independently upgradable from the VC that hosts them.

In addition to the VDUs 202, the VNFD 200 also includes internal Virtual Link Descriptors (VLD) 216 which describe the network connectivity requirements between VNFCs within a VNF. Additionally, the VNFD 200 includes external network Connection Point Descriptors (CPD) 218 which describe requirements networking ports to be used for VNF 114 (See FIG. 1) communication. Further, the VNFD 200 includes descriptions of deployment flavors 220 which define size bounded deployment configurations related to capacity. Additionally, the VNFD 200 may include one or more VNF LCM script descriptors 222. Each VNF LCM script descriptor 222 provides a reference to a lifecycle management script included in the VNF Package 110 (See FIG. 1).

Figure 3:
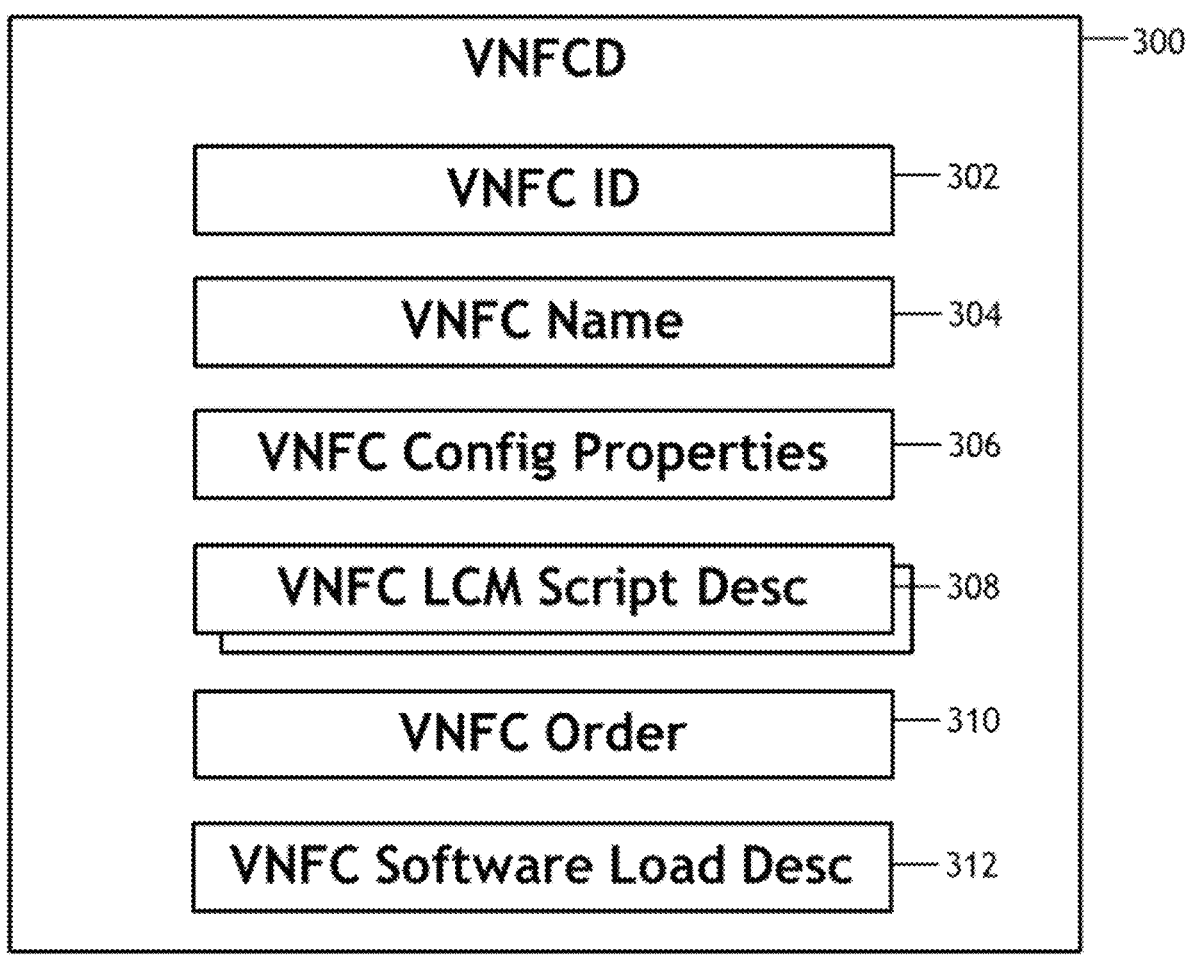
FIG. 3 is a diagram of an embodiment of a VNFC descriptor in accordance with one or more embodiments.

FIG. 3 illustrates a VNFC Descriptor 300 which describes a VNFC that makes up part of a VNF 114 (See FIG. 1) in accordance with one or more embodiments of the present application. The ID attribute 302 provides a unique identifier within the VNF for referencing a particular VNFC. In one embodiment this identifier 302 is used to specify a particular VNFC during a VNFC lifecycle management operation (start, stop kill, etc.). In another embodiment, this identifier 302 is used to determine the location of a VNFC-specific lifecycle management script within a VNF package 110 (See FIG. 1). Further, a VNFCD 300 may include a human readable VNFC name 304. Additionally, a VNFCD 300 may be include a set of configurable properties 306 of all VNFC instances based on this VNFCD 300. Further, a VNFC Descriptor 300 may include one or more VNFC specific lifecycle management script descriptors 308. Each LCM script descriptor 304 provides a reference to a VNFC lifecycle script included in the VNF Package 110 (See FIG. 1). Additionally, a VNFC Descriptor 300 may also include an order attribute 310. An order attribute may be used to control the start/stop order of the VNFCs during VNF lifecycle operations such as instantiate and upgrade. Further, a VNFC Descriptor 300 may also include a software load descriptor 312. A software load descriptor 312 provides a reference to a VNFC software load included in the VNF Package 110 (See FIG. 1).

Figure 4:
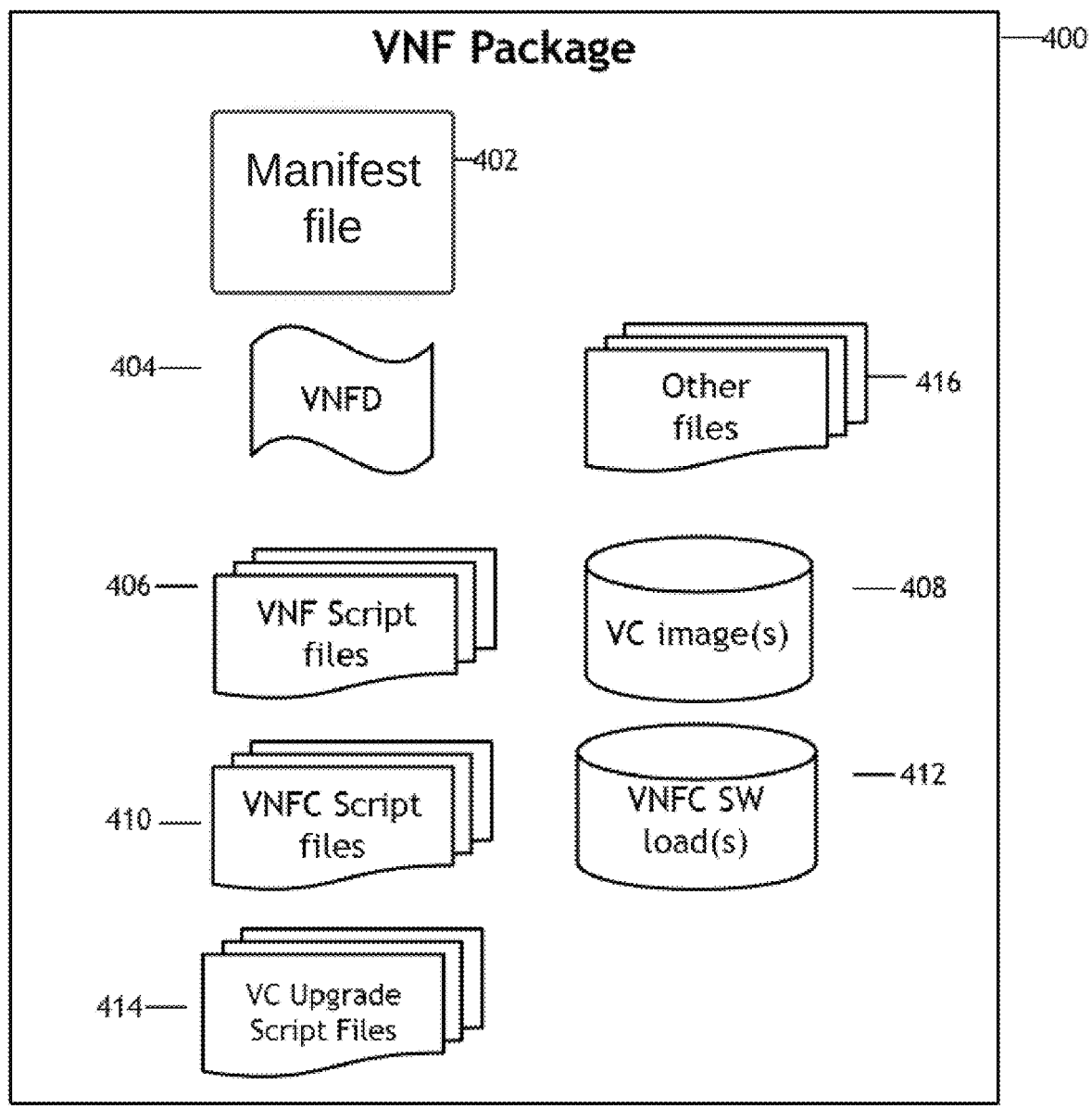
FIG. 4 is a diagram of an embodiment of a VNF package in accordance with one or more embodiments.

In accordance with one or more embodiments of the present application, FIG. 4 illustrates a VNF Package 400 which includes the requirements, configuration and software images required to onboard a VNF 114 (See FIG. 1) in an NFV system 100 (See FIG. 1). The VNF package is delivered by a VNF provider as a whole and is immutable. The package is digitally signed to protect it from modification. VNF Packages 400 are stored in an NS Catalog 140 (See FIG. 1) in an NFV System 100 (See FIG. 1). Each package contains a manifest file 402 which specifies the list of contents it contains. Further, the package 400 contains a VNFD 404, which as described in FIG. 3, includes the metadata for VNF onboarding and lifecycle management. Additionally, any VNF specific lifecycle management (onboard, deploy, start, etc.) scripts 406 are included. The actual binary images for each VC (VDU) 408 are also supplied. In some embodiments, a VC binary image is fully populated with the installed software of one or more VNFCs. In other embodiments, a VC binary image is populated with everything but the software required for running the associated VNFCs. In accordance with one or more embodiments of the present application, the VNF package 400 may also contain any VNFC specific lifecycle script files 410 supplied by the VNF provider. Further, in accordance with one or more embodiments of the present application, the VNF package 400 may also contain any VNFC software loads 412 supplied by the VNF provider. These VNFC software loads 412 are useful during upgrade scenarios, as it may be desirable to upgrade an individual VNFC instead of the entire VC. It should be noted that in some embodiments, the VNFC software loads 412 are also included in the VC image binary file 408 in order to ease and expedite initial deployment. Further, in accordance with one or more embodiments of the present application, the VNF package 400 may also contain VC upgrade scripts 414 supplied by the VNF provider. These VC upgrade scripts 414 enable VC changes which may be required in order to run a newer version of one or more VNFCs. Additionally, the VNF package may include other files 416, which may consist of, but are not limited to, test files, license files and change log files.

In accordance with one or more embodiments of the present application, FIG. 5 illustrates a VNF Package Archive 500 which is a compressed collection of the contents of a VNF Package 400 (See FIG. 4). In one embodiment, the Cloud Service Archive (CSAR) format is used for delivery of VNF packages 400 (See FIG. 4). A CSAR file is a zip file with a well-defined structure. In one embodiment the CSAR file structure conforms to a version of the Topology and Orchestration Specification for Cloud Application (TOSCA) standards. In one embodiment, the VNF package archive 500 conforms to a version of the TOSCA Simple Profile for NFV specification.

The exemplary VNF Package Archive 500 embodiment includes a VNFD specification file 502. In one embodiment, this file is expressed in Yet Another Modeling Language (YAML). The name of the file will reflect the VNF being delivered. Additionally, the package archive 500 may include a manifest file 504, which lists the entire contents of the archive. In one embodiment, the manifest 504 will also include a hash of each included file. Further, a signing certificate, including a VNF provider public key, may also be included 506 to enable verification of the signed artifacts in the archive 500. Additionally, a change log file 508 may be included that lists the changes between versions of the VNF. A licenses directory 510 may also be included that holds the license files 512 for all the applicable software component contained in the various software images 526. An artifacts directory 514 may be present to hold scripts and binary software images delivered in this package archive 500. Under the artifacts directory, a scripts directory 516 may be present to hold the VNF lifecycle management scripts 518.

In accordance with one or more embodiments of the present application, the archive 500 may include a hierarchical directory structure 520 for organization of all VDU artifacts under the artifacts directory 514. Under directory 520 may be a directory 522 for each specific VDU/VC. Under directory 522 may be a directory 524 for VDU/VC software image files 526. Further, under directory 522 may be a directory 528 for VDU/VC upgrade script files 530. Additionally, there may be a VNFC directory 532, which contains a directory for each specific VNFC 534 included in the VDU. In one embodiment, the name of directory 534 will match that of the ID field 302 (See FIG. 3) of the applicable VNFCD. Under each VNFC specific directory 534 may be a scripts directory 536 which contains lifecycle management script files 538 for the VNFC. Additionally, a software loads directory 540 may be present to hold VNFC software loads 542.

It should be understood that though a very hierarchical organization structure is depicted in this embodiment, other embodiments with flatter organization structures are equally applicable so long as the corresponding load and script descriptors in the VNFD 404 (See FIG. 4) reflect the correct location.

Figure 6:
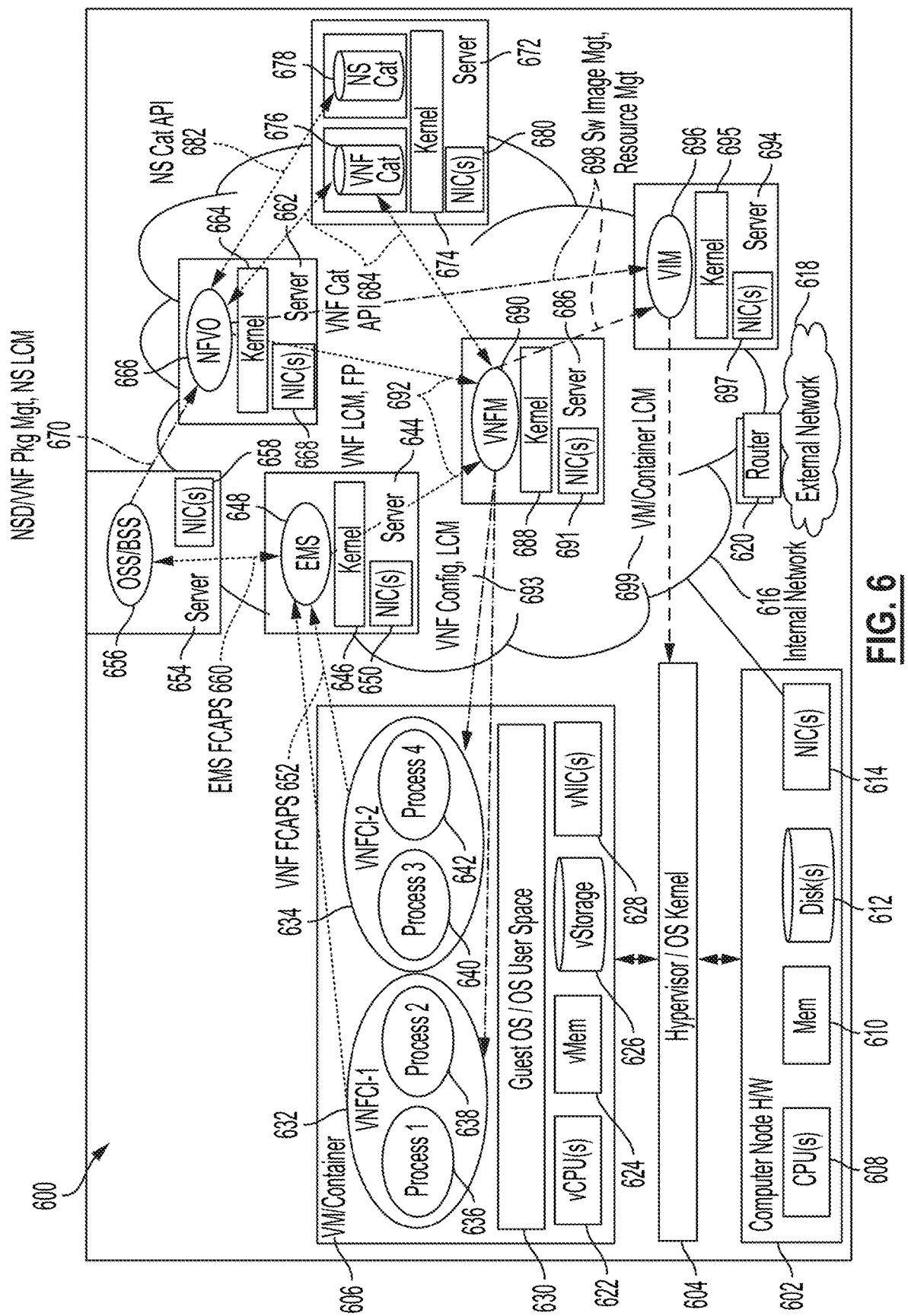
FIG. 6 is a diagram of an embodiment of a deployment of a VNF with multiple VNFCIs in a single Virtualized Container (VC).

FIG. 6 illustrates an NFV deployment 600 that includes a Virtualized Container (VC) hosting multiple VNFCs in accordance with one or more embodiments of the present application. The NFV system 600 is comprised of at least one physical compute node 602. In one embodiment, the compute node 602 hosts a hypervisor 604, which in turn manages one or more Virtual Machines (VMs) 606. In another embodiment, the compute node 602, hosts an operating system (OS) kernel 604 which manage one or more containers 606. Both embodiments provide virtualization environments in which the VNF Component Instances (VNFCI) 632 and 634 reside. As the virtualization environment provided by both embodiments is sufficient for execution, the two embodiments should be considered interchangeable herein, and are referenced by the term Virtualized Container (VC). In accordance with one or more embodiments of the present application, the VNFCIs 632 and 634 execute in VC 606.

Compute node 602 is comprised of a Central Processing Unit (CPU) module 608, a memory module 610, a disk module 612 and a network interface card (NIC) module 614. As further shown in FIG. 6, NIC 614 communicate network packets via a physical internal network 616, where in accordance with one or more preferred embodiments network 616 may be a private network. The internal network may be connected to an external physical network 618 via, for example, one or more network routers 620.

Each VC 606 is comprised of a series of virtual resources that map to a subset of the physical resources on the compute nodes 602. Each VC is assigned one or more virtual CPUs (vCPUs) 622, an amount of virtual memory (vMem) 624, an amount of virtual storage (vStorage) 626 and one or more virtual NICs (vNIC) 628. A vCPU 622 represents a portion or share of a physical CPU 608 that are assigned to a VM or container. A vMem 624 represents a portion of volatile memory (e.g. Random Access Memory) 610 dedicated to a VC. The storage provided by physical disks 612 are divided and assigned to VCs as needed in the form of vStorage 626. A vNIC 628 is a virtual NIC based on a physical NIC 614. Each vNIC is assigned a media access control (MAC) address which is used to route packets to an appropriate VC. A physical NIC 614 can host many vNICs 628.

In the case of a VM, a complete guest operating system 630 runs on top of the virtual resources 622-628. In the case of an operating system container, each container includes a separate operating system user space 630, but shares an underlying OS kernel 604. In either embodiment, typical user space operating system capabilities such as secure shell and service management are available.

One or more VNFC instances (VNFCIs) 632 and 634 may reside in VC 606. In accordance with one or more embodiments of the present application, the VNFCIs 632 and 634 are instances of different types of VNFCs. In some embodiments the VNFCIs 632-634 are composed of multiple operating system processes 636-642. In one embodiment each VNFCI 632 or 634 may be installed and managed as an operating system service. In another embodiment, a VNFCI 632 or 634 may be managed by a local NFV based software agent.

In one embodiment, a server 644, running a virtualization layer with a shared kernel 646, provides one or more VCs, at least one of which hosts an EMS 648 which is responsible for one or more of the fault, configuration, accounting, performance and security (FCAPS) services of one or more VNFCIs 632-634. The server 644 has one or more NICs 650 which provide connectivity to an internal network 616 over which all incoming and outgoing messages travel. There may be many EMSs in a system 600. An EMS 648 sends and receives FCAPS messages 652 to/from all VNFCIs 632-634 that it is managing.

In one embodiment, a server 654 hosts an OSS/BSS 656 which is responsible for managing an entire network. It is responsible for consolidation of fault, configuration, accounting, performance and security (FCAPS) from one or more EMSs 648. The server 654 has one or more NICs 658 which provide connectivity to an internal network 616 over which all incoming and outgoing messages travel. The OSS/BSS 656 exchanges FCAPS messages 660 to maintain a network wide view of network faults, performance, etc. Additionally, the OSS/BSS 656 understands and manages connectivity between elements (VNFCIs in this case), which is traditionally beyond the scope of an EMS 648. In accordance with one or more embodiments of the present application, an OSS/BSS 656 also manages network services and VNFs through an NFV Orchestrator (NFVO) 666.

In accordance with one or more embodiments of the present application, a server 662, running a virtualization layer with a shared kernel 664, provides one or more VCs, at least one of which hosts an NFVO 666. The server 662 has one or more NICs 668 which provide connectivity to an internal network 616 over which all incoming and outgoing messages travel. The NFVO 666 provides the execution of automated sequencing of activities, task, rules and policies needed for creation, modification, removal of network services or VNFs. Further, the NFVO 666 provides an API 670 which is usable by other components for network service and VNF lifecycle management (LCM).

In accordance with one or more embodiments of the present application, a server 672, running a virtualization layer with a shared kernel 674, provides one or more VCs, hosting one or more catalogs used by the NFVO 666. These include, but are not limited to, a Network Services (NS) Catalog 676 and a VNF Catalog 678. The server 672 has one or more NICs 680 which provide connectivity to an internal network 616 over which all incoming and outgoing messages travel. The NS Catalog 676 maintains a repository of all on-boarded Network Services. The NS Catalog 676 provides a catalog interface 682 that enables storage and retrieval of Network service templates, expressed as Network Service Descriptors (NSDs). The VNF Catalog 678 maintains a repository of all on-boarded VNF packages. In one embodiment VNF packages are provided in accordance with VNF Package format 400 (see FIG. 4). The VNF Catalog 678 provides a catalog interface 684 that enables storage and retrieval of VNF package artifacts such as VNF Descriptors (VNFD) 404, software images 412, manifest files 402, etc. This interface is utilized by both the NFVO 666 and the VNFM 690 when performing VNF lifecycle operations.

In accordance with one or more embodiments of the present application, a server 686 running a virtualization layer with a shared kernel 688, provides one or more VCs, at least one of which hosts an VNFM 690. The server 686 has one or more NICs 691 which provide connectivity to an internal network 616 over which all incoming and outgoing messages travel. The VNFM 690 supports VNF configuration and lifecycle management. Further it provides interfaces 692 for these functions that the NFVO 666 utilizes to instantiate, start, stop, etc. VNFs. In one embodiment, the VNFM 690 retrieves VNF package archives 500 (See FIG. 5) or package contents 502-542 (See FIG. 5) directly from an VNF Catalog 676 in order to instantiate a VNF. In another embodiment, the VNFM 690 caches VNF package archives 500 (See FIG. 5) or package contents 502-542 (See FIG. 5) managed VNFs for efficient access. In a preferred embodiment, VNF LCM interface 692 provide additional commands for LCM of individual VNFCs 632-634. Further, once a VNF is instantiated, the VNFM 690 may control, monitor, and update its configuration based on interfaces 693 that it is required to provide. As each VNF is comprised of one or more VNFCIs 632-634, the configuration and monitoring interface is implemented on at least one of the VNFCIs 632 or 634. Given this, the interfaces 693 are instantiated in one or more VNFCIs 632-634.

In accordance with one or more embodiments of the present application, a server 694 running a virtualization layer with a shared kernel 695, provides one or more VCs, at least one of which hosts a VIM 696 which is responsible for managing the virtualized infrastructure of the NFV System 600. The server 694 has one or more NICs 697 which provide connectivity to an internal network 616 over which all messages travel. There may be many VIMs 696 in a system 600. The VIM 696 provides resource management interfaces 698 which are utilized by the VNFM 690 and the NFVO 666. In a preferred embodiment, the VIM 696 extracts and caches VC images stored in VNF Packages archives 500 (See FIG. 5) in order expedite the deployment process. In order to fulfill a resource management request, a VIM 696 may need to manage a compute node 602, hypervisor/OS 604, VM 606, network 616 switch, router 620 or any other physical or logical element that is part of the NFV System 600 infrastructure. In one embodiment, a VIM 696 utilizes a container/VM lifecycle management interface 699 provided by the hypervisor/OS kernel in order to process an LCM request from a VNFM 690. In another embodiment, a VIM 696 will query the states of requisite logical and physical elements when a resource management request 698 is received from a VNFM 690 or NFVO 666. This embodiment may not be efficient however given the elapsed time between state requests and responses. In another embodiment, a VIM 696 will keep a current view of the states of all physical and logical elements that it manages in order to enable efficient processing when element states are involved. Further, in some embodiments a VIM 696 updates the NFVO 666 about resource state changes using the resource management interface 698.

Figure 7:
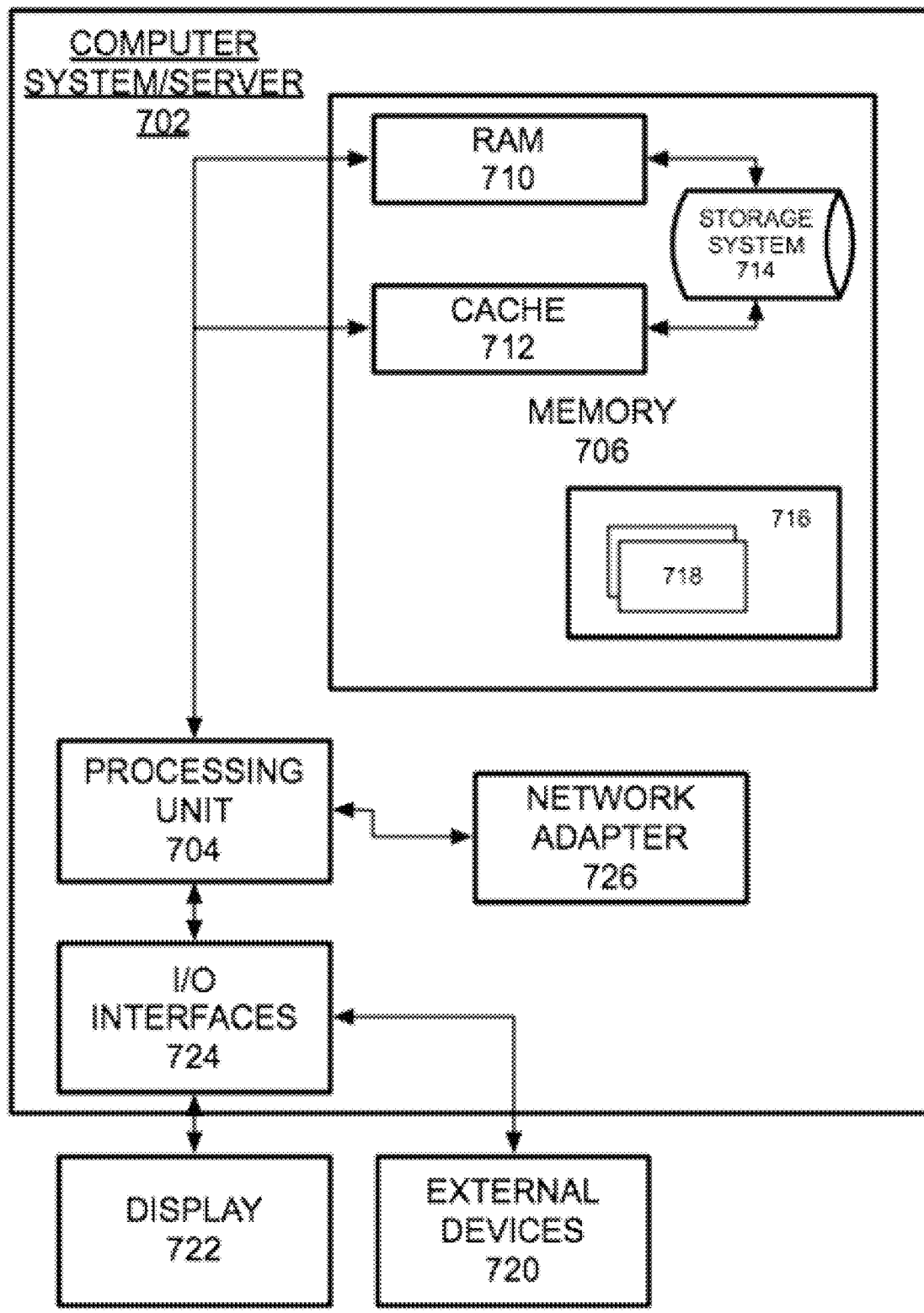
FIG. 7 is a diagram of an embodiment of a standard hardware diagram in accordance with one or more embodiments.

FIG. 7 illustrates one example of a computing node 700 to support one or more of the example embodiments. This is not intended to suggest any limitation as to the scope of use or functionality of the embodiments described herein. Regardless, the computing node 700 is capable of being implemented and/or performing any of the functionalities or embodiments set forth herein.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus 708 that couples various system components including system memory 706 to processor 704.

Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and nonvolatile media, removable and non-removable media.

The system memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CDROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of various embodiments as described herein.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments as described herein.

Aspects of the various embodiments described herein may be embodied as a system, method, component or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

In general, the routines executed to implement the embodiments, whether implemented as part of an operating system or a specific application; component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the embodiments. Moreover, while the embodiments have and herein will be described in the context of fully functioning computers and computer systems, the various embodiments are capable of being distributed as a program product in a variety of forms, and that the embodiments apply equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

\In addition, various program code described herein may be identified based upon the application or software component within which it is implemented in specific embodiments. However, it should be appreciated that any particular program nomenclature used herein is merely for convenience, and thus the embodiments should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the embodiments are not limited to the specific organization and allocation of program functionality described herein.

The exemplary environment illustrated in FIG. 7 is not intended to limit the present embodiments. Indeed, other alternative hardware and/or software environments may be used without departing from the scope of the embodiments described herein.

Figure 8:
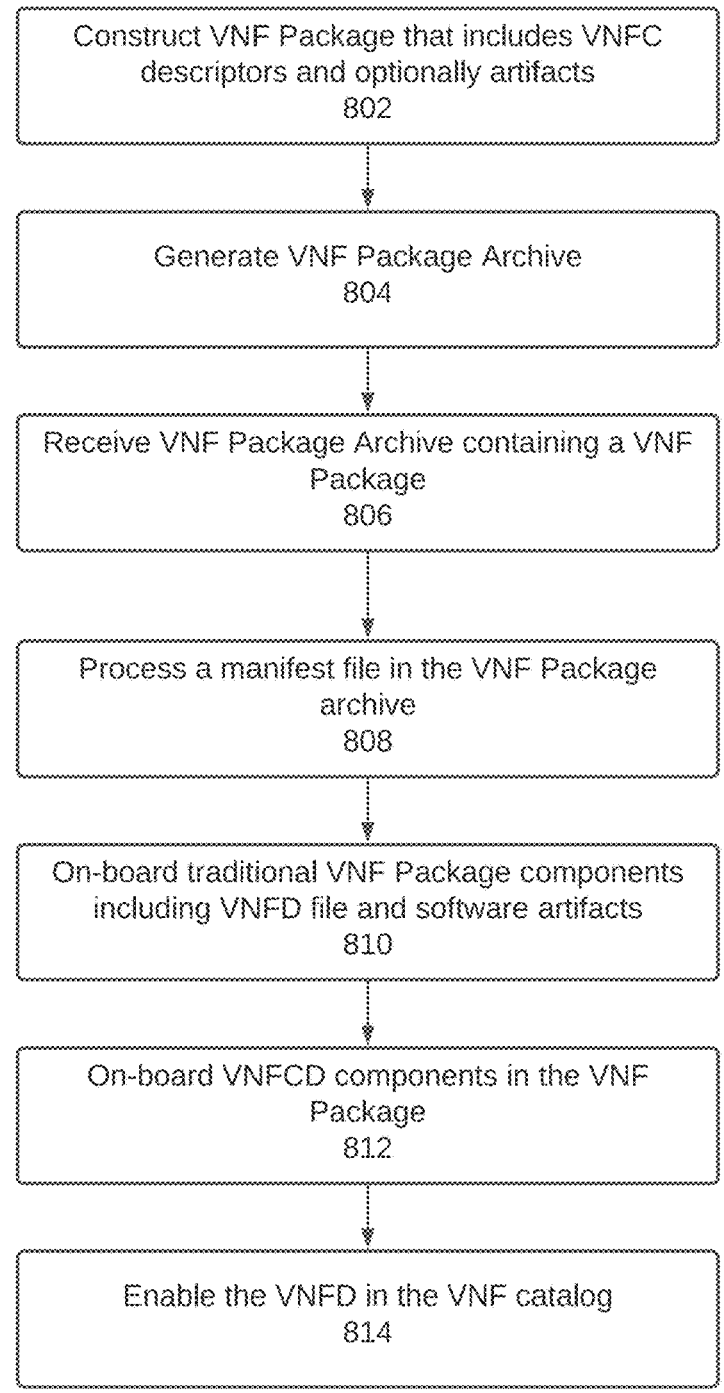
FIG. 8 is a diagram of an embodiment of a VNF onboarding flow chart in accordance with one or more embodiments.

In accordance with one or more embodiments of the present application, FIG. 8 illustrates a VNF onboarding process 800 for a VNF which include one or more VDUs composed of multiple VNFCs. A VNF provider constructs a VNF package 802 that includes at least one of a VNFD 200 (See FIG. 2) with one or more VNFC descriptors 300 (See FIG. 3) or one or more VNFC artifacts 410-412 (See FIG. 4). In one embodiment, the VNFD is constructed as described in FIG. 2. In some embodiments, the VNFC descriptors are constructed as described in FIG. 3. In one embodiment, the VNF Package includes one or more VNFC lifecycle management scripts 410 (See FIG. 4). In another embodiment, the VNF package includes one or more VNFC software loads 412 (See FIG. 4).

Once the VNF package 400 (See FIG. 4) has been constructed, the VNF provider generates an archive 804 that contains the contents in compliance with the requirements of the destination NFVO 666 (See FIG. 6)/134 (See FIG. 1). In accordance with one or more embodiments of the present application, the archive may reflect the exemplary embodiment depicted in FIG. 5. In one embodiment, the archive may be in the Cloud Service Archive (CSAR) format.

In step 806, an NFVO 666 (See FIG. 6) receives the VNF Package Archive 500 (See FIG. 5) from a VNF Provider which includes a VNF Package 400 (See FIG. 4). In one embodiment, the archive is received by a package management system included within the NFVO 666 (See FIG. 6). Once the package archive is received by the NFVO 666 (See FIG. 6), the manifest file 504 (See FIG. 5) is located and processed 808. If the manifest file is not found, then processing of the archive ceases. If it is found, then the signing certificate 506 (See FIG. 5) is processed. Additionally, the NFVO 666 (See FIG. 6) may perform other security checks based on checksum, digest, etc. files contained in the archive against the trusted manifest file.

In step 810, the NFVO 666 (See FIG. 6)/134 (See FIG. 1) on-boards the traditional VNF package components. The VNFD file 502 (See FIG. 5) is first located and extracted from the VNF Package Archive 500 (See FIG. 5). In one embodiment, the NFVO may process the identification attributes in the VNFD file 502 (See FIG. 5), to see if the VNFD 200 (See FIG. 2) has been previously on-boarded into the VNF catalog 676 (See FIG. 6). If the VNF identifier plus version are identical to what is in the catalog, then the VNF Provider may be prompted to confirm whether or not to continue, as this will result in a VNF package overwrite. If a VNFD file 502 (See FIG. 5) under the same identification attributes is found, but the version is newer, then the NFVO 666 (See FIG. 6) may process this as a package update instead of as a package addition. In accordance with one or more embodiments of the present application, the VNFD file 502 (See FIG. 5) may include one or more VNFC descriptors 212 (See FIG. 2).

Once the VNFD file 502 (See FIG. 5) is on-boarded, additional VNF package components 406-414 (See FIG. 4) are located and processed. In some embodiments, the NFVO 666 (See FIG. 6) loads VNFC software images and/or lifecycle management scripts 406-408 (See FIG. 4). In one embodiment, these artifacts are extracted from the archive 500 (See FIG. 5) and stored along with the VNFD file in the VNF catalog 676 (See FIG. 6). In another embodiment, one or more of these artifacts may be stored in another database, and an external reference is added to the VNF entry in the VNF catalog 676 (See FIG. 6). In some cases, the VC software image reference 210 (See FIG. 2) may specify an external source. In such an embodiment, the software image may be uploaded from the source and stored in the VNF catalog 676 (See FIG. 6) for efficient, localized access.

In step 812, and in accordance with one or more embodiments of the present application, VNFC components/artifacts are located and processed. In some embodiments, the NFVO 666 (See FIG. 6) loads VNFC software loads and/or lifecycle management scripts 410-412 (See FIG. 4). In one embodiment, these components/artifacts are extracted from the archive 500 (See FIG. 5) and stored along with the VNFD file in the catalog 676 (See FIG. 6). In another embodiment, one or more of these artifacts may be stored in another database, and an external reference is added to the VNF entry in the VNF catalog 676 (See FIG. 6). In some cases, the VNFC software load reference 312 (See FIG. 3) may specify an external source. In such an embodiment, the software load may be uploaded from the source and stored in the VNF catalog 676 (See FIG. 6) for efficient, localized access.

In step 814, the VNFD in enabled in the VNF catalog 676 (See FIG. 6). In some embodiments, the NFVO 666 (See FIG. 6)/134 (See FIG. 1) automatically enables the VNFD once the on-boarding process has completed.

Figure 9:
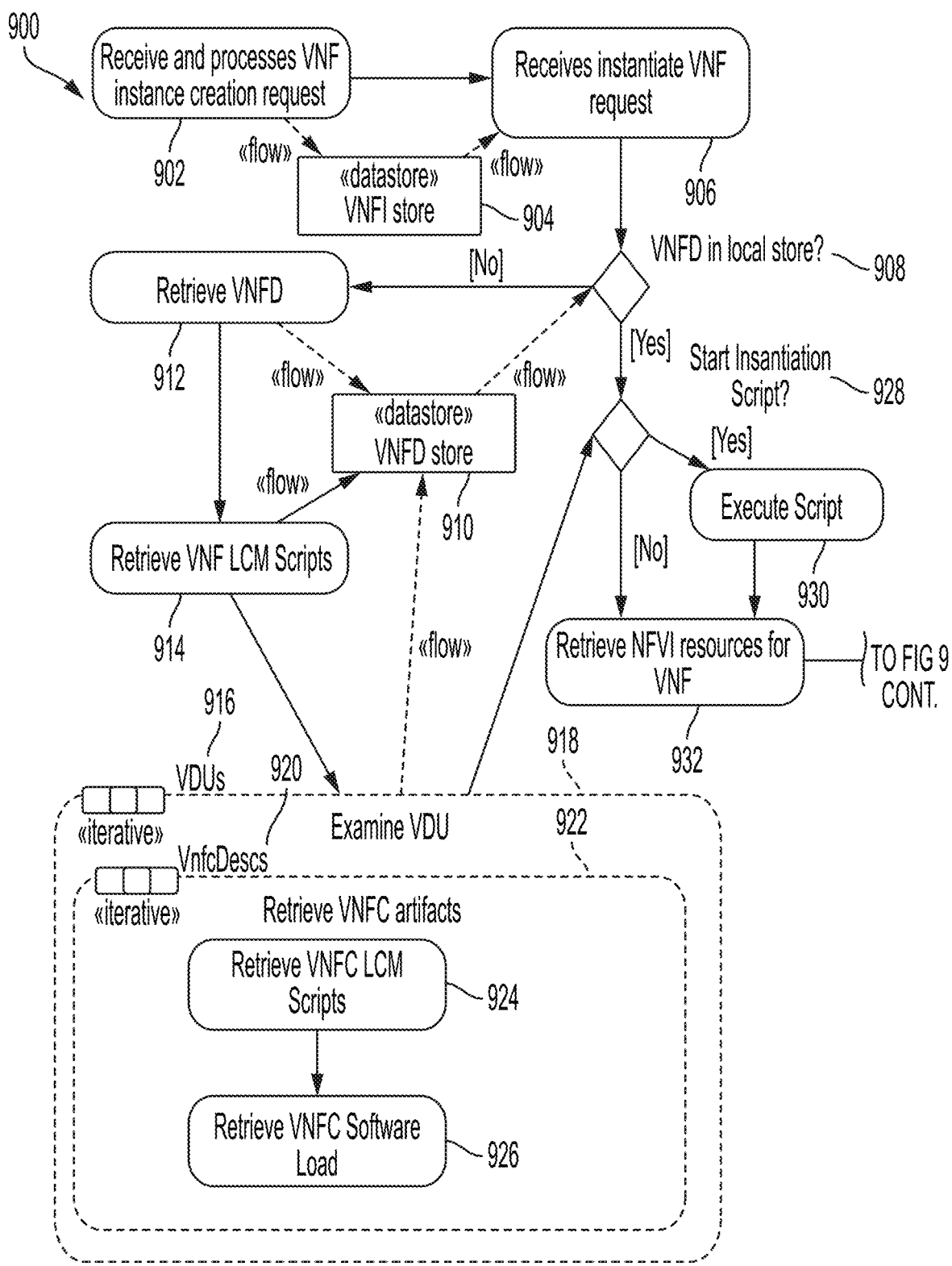
FIG. 9 is a diagram of an embodiment of a VNF instantiation flow chart in accordance with one or more embodiments.
Figure 9:
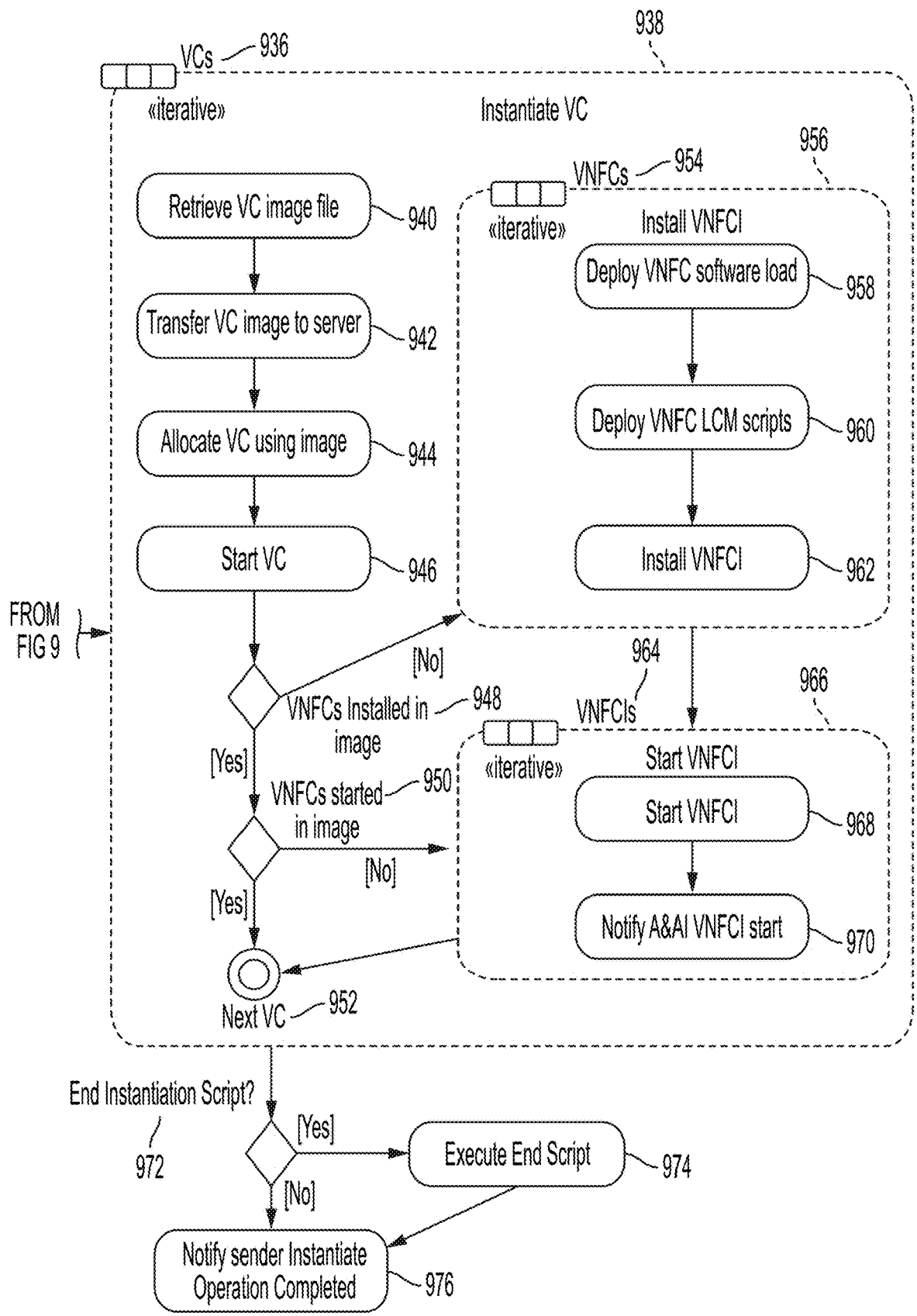

In accordance with one or more embodiments of the present application, FIG. 9 illustrates a VNF instantiation process 900 for a VNF which includes one or more VDUs that contain multiple VNFCs. Prior to this process, it is expected that the VNF package has been on-boarded as described by process 800 (see FIG. 8) or is otherwise functional.

In some embodiments, the process starts in step 902 with a VNFM 690 (See FIG. 6) receiving a VNF creation request from an NFVO 666 (See FIG. 6). The creation request includes the ID of the VNFD 200 (See FIG. 2), which was stored in the VNF catalog 676 (See FIG. 6) as part of the onboarding process 800 (see FIG. 8). The VNFM 690 (See FIG. 6) creates a new VNF instance ID, records it and the VNFD ID in a VNFI record in a VNFI store 904, and sends a response to the NFVO 666 (See FIG. 6) with the ID. In some embodiments, the VNFI store is a database.

In step 906, the VNFM 690 (See FIG. 6) receives a VNF instantiation request from the NFVO 666 (See FIG. 6), which includes the VNF instance ID created in the previous step, along with other parameters which may include, but is not limited to, preferred deployment flavor, scaling level and any additional VNF specific parameters required for instantiation. In order to process this request, the VNFM 690 (See FIG. 6) requires access the VNFD 200 (See FIG. 2) and other optional artifacts that were stored as part of the on-boarding process 800 (see FIG. 8).

Given this, the VNFM 690 (See FIG. 6) looks up the VNFD ID in the VNFI store 904 using the supplied VNFI ID. It then takes the VNFD ID and checks 908 a local VNFD store 910 to see if the VNFD has been retrieved from the VNF catalog 676 (See FIG. 6). If not, then it is retrieved 912 and stored in the VNFD store 910. In one embodiment, VNFD 200 (See FIG. 2) is retrieved from the VNF Catalog 676 (See FIG. 6) on an as-needed basis utilizing a Catalog query interface 684 (See FIG. 6). Likewise, any VNF LCM scripts 222 (See FIG. 2) referenced in the VNFD 200 (See FIG. 2) are retrieved 914 and stored in the VNFD store 910. In some embodiments, the VNFI store 904 and the VNFD store 910 are the same store.

Additionally, each VDU 916 in the VNFD 200 (See FIG. 2) is examined 918 for VNFC descriptors 212 (See FIG. 2). For each VNFC descriptor 920, any VNFC artifacts needed for the instantiation process are retrieved and stored 922 in the VNFD store 910. In step 924 any associated VNFC LCM scripts 308 (See FIG. 3) are retrieved and stored in the VNFD store 910. Further, in some embodiments, each VNFC software load 312 (See FIG. 3) referenced in a VNFC descriptor 300 (See FIG. 3) is also retrieved and stored 926 in the VNFD store 910.

Once all the VNFD artifacts have been retrieved and stored in the VNFD Store 910 or if the VNFD was found to already be in the VNFD store in 908, then the VNFD is examined to see if it includes a VNF LCM script associated with the start instantiation event 928. If so, then the LCM script is retrieved from the VNFD store 910 and executed 930. This script enables a VNFD to customize the behavior of the executing management module, such as the VNFM 690 (See FIG. 6), at the start of the instantiation process. Once the script has completed execution or if no script was found in step 928 then the resource reservation process 932 can proceed.

Armed with the VNFD 200 (See FIG. 2), deployment flavor, and scaling level, the VNFM 690 (See FIG. 6) coordinates reserving 932 the NFVI 106 (See FIG. 1)

resources required to instantiate the VNF instance. In one embodiment, the VNFM 690 (See FIG. 6) works directly with one or more VIMs 696 (See FIG. 6) to reserve/allocate the resources. Given that a VNF 114 (See FIG. 1) may be deployed as multiple VDUs 202 (See FIG. 2), which map 1:1 with VMs/VCs 606 (See FIG. 6), one or more VM/VCs 606 (See FIG. 6), which meet the virtual compute 120 (See FIG. 1), storage 122 (See FIG. 1), and networking 124 (See FIG. 1) requirements of the VNFCIs 632-634 (See FIG. 6) they host, must be identified and reserved. For each VC 606 (See FIG. 6) required for VNF 114 (See FIG. 1) instantiation, a VC ID is generated. This VC ID, along with a reference to managing VIM 696 (See FIG. 6), a reference to the associated VNFI record created in step 902 and one or more resource reservations are stored in a VC record in the VNFI store 904. Additionally, for each VNFCI 118 (See FIG. 1) required for VNF 116 (See FIG. 1) instantiation, a VNFCI ID is generated. This VNFCI ID, along with a reference to the associated VC record previously created in this step are stored in a VNFCI record in the VNFI store 904. Although in this exemplary embodiment, the containing entities (VNFI, VC) are referenced by the contained entity (VC, VNFCI), in other embodiments, the association may be reversed with the containing entity maintaining a list of contained entities.

If all resources are successfully reserved, then the resource allocation process can begin. In some embodiments the allocation steps are performed by the VNFM 690 (See FIG. 6). In a preferred embodiment the allocation steps are performed by a VIM 696 (See FIG. 6) under the direction of the VNFM 690 (See FIG. 6). Specifically, in accordance with one or more embodiments of the present application, each VC 936 identified in step 932 and stored in the VNFI store 904 is instantiated 938. In one embodiment, the first step in this process is retrieval 940 of a VC image file specified in the VC image descriptor 212 (See FIG. 2) included in the VDU 202 (See FIG. 2) element of the VNFD 200 (See FIG. 2) persisted in the VNFD store 910. In some embodiments, the VC image is retrieved from the VNF Catalog 676 (See FIG. 6). In some embodiments, the VC images are cached locally to expedite the instantiation process.

Once the VC image has been retrieved, the image is transferred 942 to the target physical compute node/server 602 (See FIG. 6) that will host the reserved VC selected in step 932. In some embodiments, the transfer is performed over a secure communications channel. In some embodiments, the transfer is performed using a secure transfer protocol, such as Secure File Transfer Protocol (SFTP). Once the VC image has been transferred a request is made to the Hypervisor/OS kernel 604 (See FIG. 6) running on the target physical Compute Node/server 602 (See FIG. 6), to allocate 944 the VC 606 (See FIG. 6) using the VC image file. Upon receiving a notification that the VC allocation request is complete, a request is made to the Hypervisor/OS kernel 604 (See FIG. 6) running on the target physical Compute Node 602 (See FIG. 6), to start 946 the VC 606 (See FIG. 6).

In one embodiment, the VC image 408 (See FIG. 4) supplied in the VNF package 400 (See FIG. 4) for this VDU 202 (See FIG. 2), includes pre-installed VNFCIs 632-634 (See FIG. 6). Each VNFCI installation includes the software components 410-412 (See FIG. 4) identified in the VNF package. The benefit of this embodiment is that it expedites the VNF instantiation process. The downside of this embodiment is that the VC image 408 (See FIG. 4) must be re-generated any time the version of any VNFC software component 410-412 (See FIG. 4) changes. In another embodiment, the VC image 408 (See FIG. 4) supplied in the VNF package 400 (See FIG. 4) for this VDU 202 (See FIG. 2) does not include the VNFC software components 410-412 (See FIG. 4). The benefit of this embodiment is that updates to the VNFC software component 410-412 (See FIG. 4) versions does not require a rebuild of the VC image 408 (See FIG. 4). The downside of this embodiment is the VNFC software components 410-412 (See FIG. 4) are installed after the VC 606 (See FIG. 6) is started, thereby slowing down the VNF instantiation process.

Given this, if the VNFCIs 632-634 (See FIG. 6) hosted on this VC 606 (See FIG. 6) are already installed 948, then the installation process for the VNFCIs 632-634 (See FIG. 6), is complete. At this point, a check is made to see if the VNFCIs 632-634 (See FIG. 6) have been started 950 in the VC 606 (See FIG. 6). In one embodiment, this is check is based on an attribute in the associated VDU 202 (See FIG. 2) in the VNFD stored in the VNFD store 910. In another embodiment, this condition is determined by consulting with an operating system service management subsystem running in the VC 606 (See FIG. 6). If the VNFCIs 632-634 (See FIG. 6) have been started in the VC 606 (See FIG. 6), then the VC instantiation process moves onto the next VC 952.

If the VNFCIs 632-634 (See FIG. 6) have not been started, then the VNFCIs 964 are started 966. In some embodiments the order that the VNFCIs are started is determined by an order 310 (See FIG. 3) attribute in the corresponding VNFCD 300 (See FIG. 3). At this stage, the VNFM 690 (See FIG. 6) initiates the start operation 968 on a VNFCI 632 or 634 (See FIG. 6) in the VC 606 (See FIG. 6). In one embodiment, VNFC software components associated with this VNFCI 632 or 634 (See FIG. 6) includes a custom LCM start script. In this embodiment, the VNFM 690 (See FIG. 6) requests that the VC 606 (See FIG. 6) execute the LCM start script. In another embodiment, the VNFC software component does not include a custom LCM start script. In this embodiment, a default command or series of commands between the VNFM 690 (See FIG. 6) and the OS 630 (See FIG. 6) running in the VC 606 (See FIG. 6) are executed in order to start the VNFCI 632 or 634 (See FIG. 6). As before, once all VNFCIs 632-634 (See FIG. 6) have been started in the VC 606 (See FIG. 6), then the VC instantiation process moves onto the next VC 952.

If the VNFCIs 632-634 (See FIG. 6) are not installed in the VC image 948, then the VNFCIs 954 are deployed and installed 956. In accordance with one or more embodiments of the present application, the VNFC software load is retrieved from the VNFD store 910 and transferred 958 into a filesystem accessible to VC 606 (See FIG. 6) hosting the VNFCI. In one embodiment, Secure File Transfer Protocol (SFTP) is used for file transfers between the VNFM 690 (See FIG. 6) and the VC 606 (See FIG. 6). In accordance with one or more embodiments of the present application, the VNFC LCM scripts are retrieved from the VNFD store 910 and transferred 960 into a filesystem accessible to VC 606 (See FIG. 6) hosting the VNFCI.

Once the VNFC software artifacts have been deployed 958-960, the VNFCI can be installed 962 in the VC 606 (See FIG. 6) hosting the VNFCI. In one embodiment, VNFCI software components include a custom LCM install script. In this embodiment, the VNFM 690 (See FIG. 6) requests that the VC 606 (See FIG. 6) execute the LCM install script. In one embodiment, script and/or command execution requests between the VNFM 690 (See FIG. 6) and the OS 630 (See FIG. 6) running in the VC 606 (See FIG. 6) are made via a secure shell (SSH) connection. In another embodiment, the VNFC software components do not include a custom LCM install script. In this embodiment, a default series of commands between the VNFM 690 (See FIG. 6) and the OS 630 (See FIG. 6) running in the VC 606 (See FIG. 6) are executed in order to install the VNFCI 632-634 (See FIG. 6). Once all the VNFCIs 632-634 (See FIG. 6) have been installed, then as before, the VNFCIs are started 966-970.

Once all VCs 936 have been instantiated 938, the VNFD is examined to see if it includes a VNF LCM script associated with the end instantiation event 972. If so, then the LCM script is retrieved from the VNFD store 910 and executed 974. This script enables a VNFD to customize the behavior of the VNFM 690 (See FIG. 6) at the end of the instantiation process. Once the script has completed execution or if no script was found in step 972 then the VNFM 690 (See FIG. 6) notifies 976 the NFVO 666 (See FIG. 6) that the instantiation process is complete.

Figure 10:
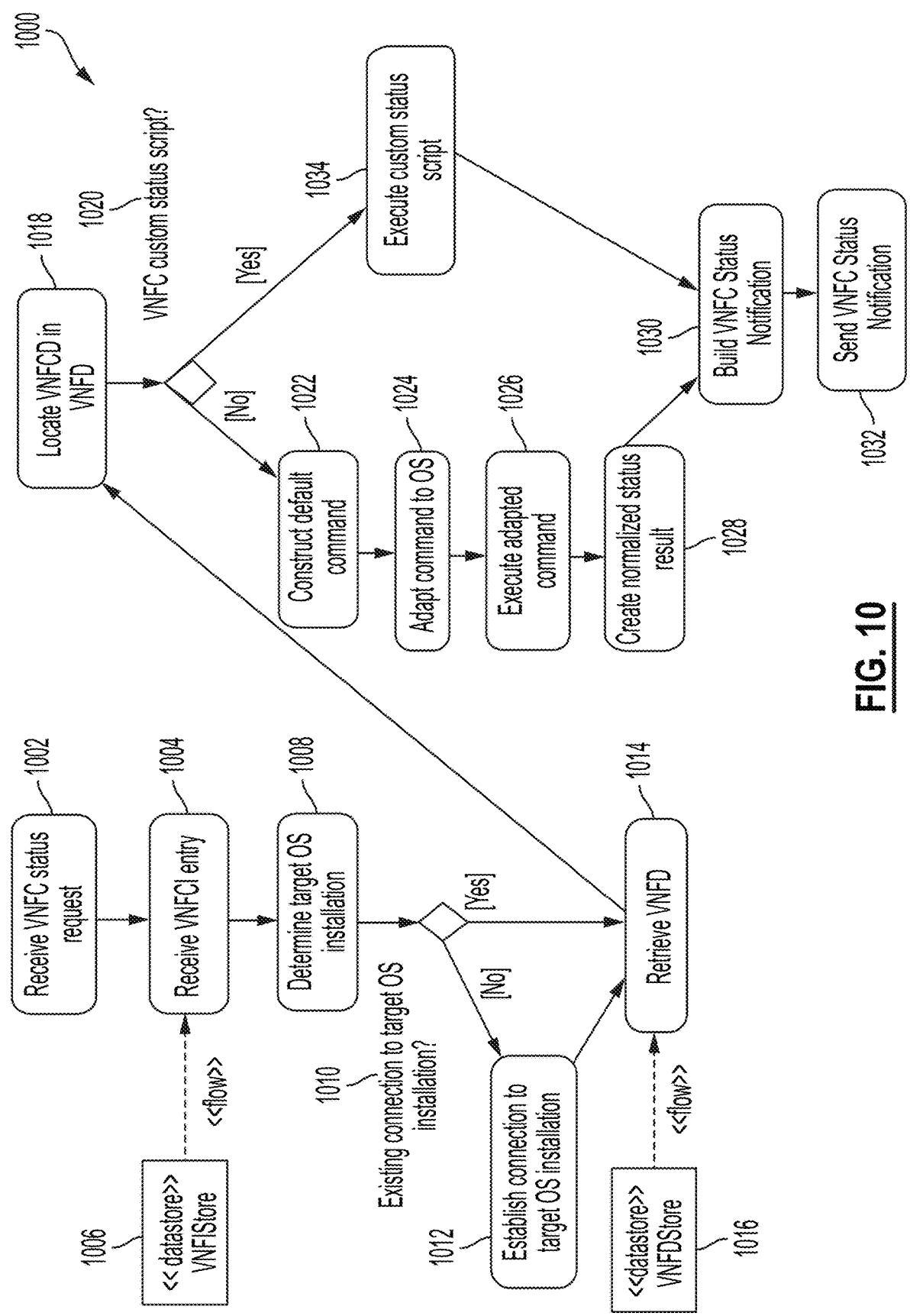
FIG. 10 is a diagram of an embodiment of a VNFC status flow chart in accordance with one or more embodiments.

In accordance with one or more embodiments of the present application, FIG. 10 illustrates a VNFC status query process 1000 for a VNFC included in a VDU with multiple VNFCs. Prior to this process, it is expected that the associated VNF has been instantiated as described by process 900 (see FIG. 9) or is otherwise functional.

The process starts in step 1002 with an VNFM 690 (See FIG. 6) receiving a VNFC status request. This request may come from an NFVO 666 (See FIG. 6), an EMS 648 (See FIG. 6), or a monitoring subsystem from within the VNFM 690 (See FIG. 6). The status request includes, but is not limited to, the ID of the VNF instance (VNFI) and the ID of the target VNFC instance 632 or 634 (See FIG. 6) that is part of the VNFI.

After receiving the request, the VNFM 690 (See FIG. 6) retrieves 1004 the VNFCI entry from a VNFI store 1006, which stores all VNFI data, that is initially populated when a VNF is instantiated 900 (See FIG. 9). The VNFM 690 (See FIG. 6) then determines the target OS installation 1008 of the status request by examining the VNFCI entry which includes a reference to the hosting VC 606 (See FIG. 6) and the OS installation 630 (See FIG. 6) within it.

Once the OS installation 630 (See FIG. 6) is determined, the VNFM checks 1010 to see if it has an established connection to the target OS installation 630 (See FIG. 6). If not, a connection is established 1012. In some embodiments, the connection is maintained for a configurable period. In some embodiments the connection is a secure connection.

In accordance with one or more embodiments of the present application, the VNFCI entry retrieved in step 1004 includes a reference to the VNFI entry which contains a reference to the VNFD 200 (See FIG. 2). The VNFD 200 (See FIG. 2) is retrieved in step 1014 from the VNFD store 1016. Using the VNFCD ID stored in the VNFCI entry during the instantiation process 922 (See FIG. 9), the VNFM locates 1018 the associated VNFCD 212 (See FIG. 2) in the VNFD 200 (See FIG. 2).

Armed with this information, the status of the target VNFCI can now be determined. This process starts by checking to see if the VNFC includes a custom LCM status script 1020 as per the VNFCD 300 (See FIG. 3). If not, then a default status command is constructed 1022 which specifies the ID of the VNFCI 632 or 634 (See FIG. 6). The VNFM 690 (See FIG. 6) then examines the version of the OS installation 630 (See FIG. 6) determined in step 1008, and based on that, plugs in an adaptor which adapts 1024 the command to match the service management framework delivered with the OS installation 630 (See FIG. 6). In one embodiment, that service management framework is Systemd. In another embodiment, the service management framework is Upstart. In some embodiments that use a Windows operating system variant, it is Windows service manager.

Once the command has been adapted for the target, the VNFM 690 (See FIG. 6) requests, over a previously established connection, that the OS installation running in the VC executes it 1026. In one embodiment, command execution requests between the VNFM 690 (See FIG. 6) and the OS 630 (See FIG. 6) running in the VC 606 (See FIG. 6) are made via a secure shell (SSH) connection.

In accordance with one or more embodiments of the present application, the command is executed synchronously, and a status result is returned. In some embodiments, the status result includes but is not limited to, the ID of the VNFCI and one or more planes of state. For example, the planes of state may include an administrative state and an operational state. In some embodiments, the ID of the VNFCI is the value in the ID field 302 (See FIG. 3) of the corresponding VNFCD 300 (See FIG. 3).

Once the result has been returned, the OS adaptor identified in step 1024 is used to create a normalized status result 1028 to be included in the notification. In one embodiment, the original, non-adapted status is also included in the normalized status result. Further, in step 1030, a VNFC status notification is built which includes the normalized result. Once built, the status notification is sent 1032 to the entity that requested the status in 1002.

In accordance with one or more embodiments of the present application, if the VNFC includes a custom LCM status script 1020 as per the VNFCD 300 (See FIG. 3), the VNFM 690 (See FIG. 6) requests that the OS installation running in the VC 606 (See FIG. 6) execute 1034 the script, which was previously deployed 954 (See FIG. 9) when the VNF was instantiated 900 (See FIG. 9). Further, the VNFM 690 (See FIG. 6) passes in the ID of the VNFCI 632 or 634 (See FIG. 6) to the script execution request. It is expected that the script is executed synchronously, and a status result is returned. It is further expected that the returned status result is normalized for inclusion in the notification as the custom script understands the adaptation required. As before, in step 1030, a VNFC status notification is built which includes the normalized result. Once built, the status notification is sent 1032 to the entity that requested the status in 1002.

Figure 11:
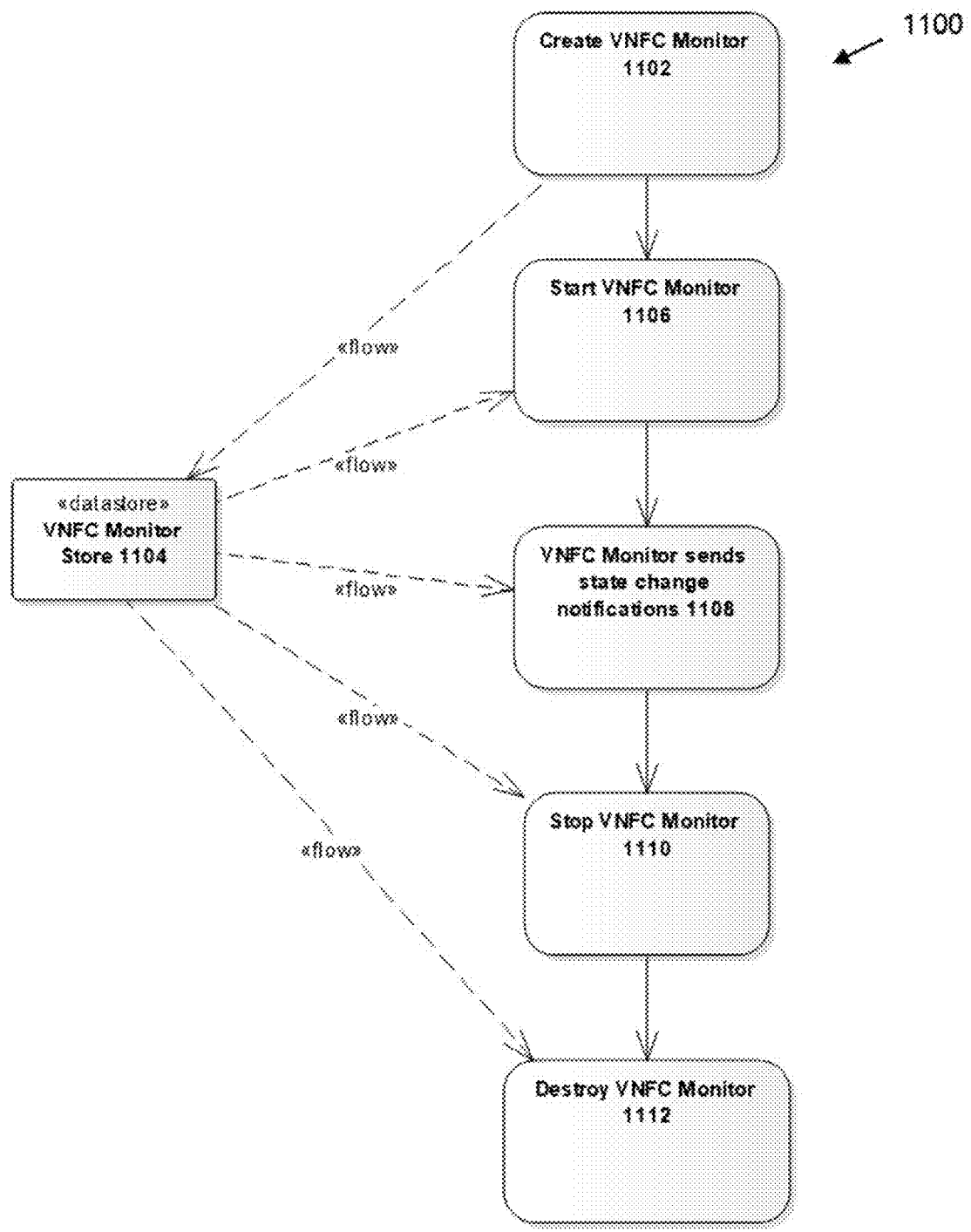
FIG. 11 is a diagram of an embodiment of a VNFC monitoring flow chart in accordance with one or more embodiments.

In accordance with one or more embodiments of the present application, FIG. 11 illustrates a VNFC status monitoring process 1100 for a VNFC included in a Virtual Deployment Unit (VDU) with multiple VNFCs. Prior to this process, it is expected that the VNF has been instantiated as described by process 900 (see FIG. 9) or is otherwise functional.

The process starts in step 1102 with an VNFM 690 (See FIG. 6) receiving a VNFC monitor creation request. In some embodiments, a monitoring subsystem in the VNFM 690 (See FIG. 6) implements this process. Typically, this type of request will originate from a management element, such as a VNFO 666 (See FIG. 6), that works with a user interface component which displays VNFCI states. The creation request includes, but is not limited to, the ID of the VNF instance (VNFI) and the ID of the target VNFC instance (VNFCI) 632 or 634 (See FIG. 6) that is part of the VNFI. Upon receiving the request, the VNFM 690 (See FIG. 6) creates a VNFC monitor, generates a unique ID for it and stores it in the monitor. Additionally, the request originator, the VNFI ID, and the target VNFC ID are stored in it. Further, the monitor includes a last known status attributes, which is initially empty. After the monitor is created, the monitor is added to a VNFC Monitor store 1104 using its ID as they key. In a preferred embodiment, the monitor store 1104 is stored in Random Access Memory (RAM) for efficient access. Once stored, the VNFM 690 (See FIG. 6) sends a response which includes the monitor ID.

Once a monitor has been created the VNFM 690 (See FIG. 6) may receive a VNFC start monitor request which includes the monitor ID returned in step 1102. In some embodiments, the request may also include a polling frequency parameter. Receipt of this request prompts the VNFM 690 (See FIG. 6) to lookup the monitor in the VNFC Monitor store 1104 and start the monitor 1106. In some embodiments, starting the monitor results in a polling timer getting created and started. In some embodiments, the timer expiration setting is determined by a polling frequency supplied in the Start VNFC monitor request. In a polling embodiment, when the timer expires a VNFC status request may be issued within the VNFM 690 (See FIG. 6). In some embodiments, the VNFM uses a VNFC status query process, such as the one depicted in 1000 (See FIG. 10). Further, when the timer expires, it is restarted to prompt the next status poll.

Upon receipt of a status query response, the VNFM 690 (See FIG. 6) looks up the monitor in the VNFC Monitor store 1104 and then compares the last known VNFCI module status, to the current status included in the response. If any component of the status has changed, then a VNFC monitor status change notification is built with the current status and sent to the originator of the monitor 1108. Further, the current status is copied into the last known status attribute of the monitor. If no components of the status have changed, then the monitor does not take any action until the next timer expiry.

Once a monitor has been started, the VNFM 690 (See FIG. 6) may receive a VNFC stop monitor request which includes the monitor ID returned in step 1102. Receipt of this request prompts the VNFM 690 (See FIG. 6) to lookup the monitor in the VNFC Monitor store 1104 and stop the monitor 1110. In some embodiments stopping the monitor results in the polling timer being stopped and destroyed. Additionally, in some embodiments, the last known state attribute is cleared.

Once a monitor has been stopped, the VNFM 690 (See FIG. 6) may receive a VNFC destroy monitor request which includes the monitor ID returned in step 1102. Receipt of this request prompts the VNFM 690 (See FIG. 6) to lookup the monitor in the VNFC Monitor store 1104 and destroy the monitor 1112. In some embodiments destroying the monitor results in the monitor being removed from the VNFC monitor store 1104 and deleted.

Figure 12:
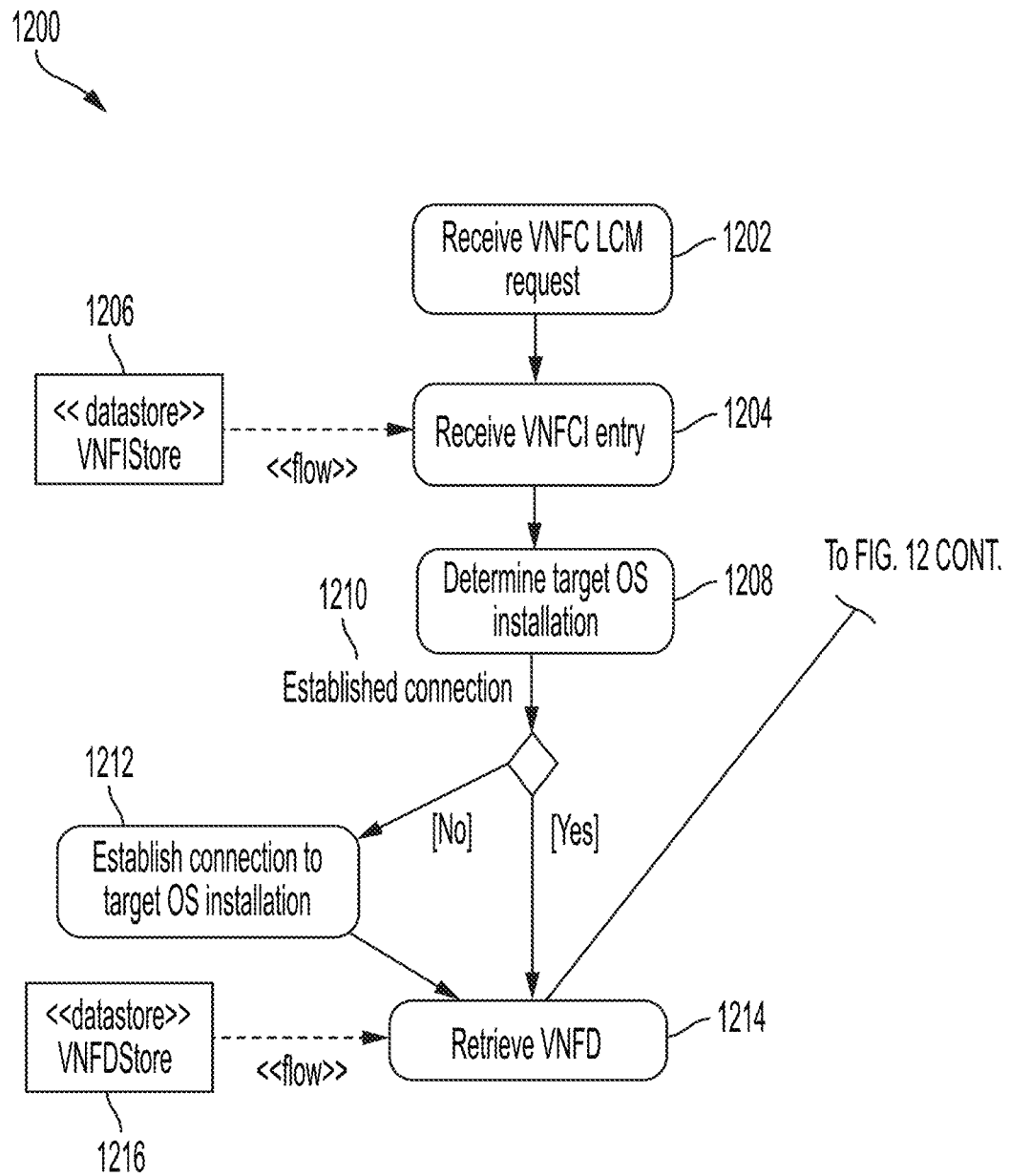
FIG. 12 is a diagram of an embodiment of a VNFC lifecycle management flow chart in accordance with one or more embodiments.
Figure 12:
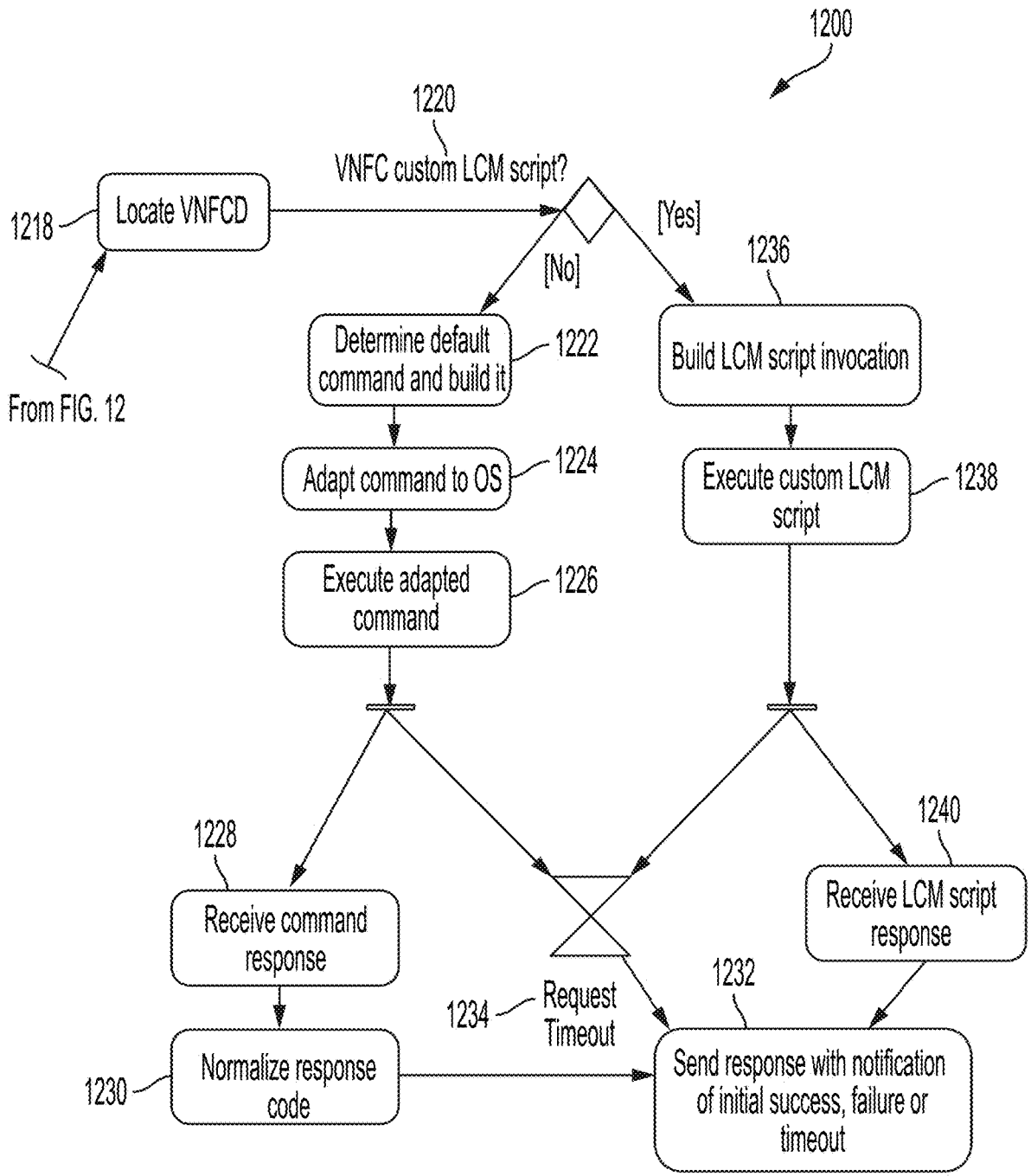

In accordance with one or more embodiments of the present application, FIG. 12 illustrates a process 1200 for handling VNFC software lifecycle management (start, stop, restart, kill, etc.) operations. Prior to this process, it is expected that the VNF has been instantiated as described by process 900 (See FIG. 9) or is otherwise functional. In some embodiments, the VNFCIs may also be currently monitored as described by process 1100 (See FIG. 11).

The process starts in step 1202 with a VNFM 690 (See FIG. 6) receiving a VNFC LCM request. This request may come from an NFVO 666 (See FIG. 6) or an EMS 648 (See FIG. 6) or a management subsystem inside the VNFM 690 (See FIG. 6). The LCM request includes, but is not limited to, the operation to be performed, the ID of the VNF instance (VNFI), the ID of the target VNFC instance 632 or 634 (See FIG. 6) that is part of the VNFI, and any parameters needed by the operation. For example, a kill operation may include a signal parameter which indicates whether an orderly shutdown will be attempted or if an immediate termination is desired.

After receiving the request, the VNFM 690 (See FIG. 6) retrieves 1204 the VNFCI entry from a VNFI store 1206, which stores all VNFI data, which is initially populated when a VNF is instantiated 900 (See FIG. 9). The VNFM 690 (See FIG. 6) then determines the target OS installation 1208 of the status request by examining the VNFCI entry which includes a reference to the hosting VC 606 (See FIG. 6) and the OS installation 630 (See FIG. 6) within it.

Once the target OS installation 630 (See FIG. 6) is determined, a check is made for an existing connection 1210 between the VNFM 666 (See FIG. 6) and the target OS installation 630 (See FIG. 6). If a connection is not currently established, then one is setup 1212. In some embodiments, the connection between the VNFM 690 (See FIG. 6) and the target OS installation 630 (See FIG. 6) is a secure shell (SSH) connection. As depicted here, in some embodiments, a connection between the VNFM 690 (See FIG. 6) and the OS 630 (See FIG. 6) is established on an as needed basis. In some embodiments, these connections are maintained for a configurable time period.

The VNFCI entry retrieved in step 1204 includes a reference to the VNFI entry which contains a reference to the VNFD, which is retrieved in step 1214 from the VNFD store 1216. The VNFC descriptor 300 (See FIG. 3) for the target VNFCI is then retrieved 1218 from the VNFCDs 212 (See FIG. 2) in the VNFD 200 (See FIG. 2). In some embodiments, the target VNFCI is specified in the LCM request using the VNFC descriptor ID attribute 302 (See FIG. 3). In other embodiments, the target VNFCI is specified by the name it is installed under in the target OS installation 630 (See FIG. 6).

In accordance with one or more embodiments of the present application, a check is then made in the VNFC descriptor 300 (See FIG. 3) to see if this type of VNFC includes a custom LCM script 1220 for the operation specified in the LCM request. In other embodiments, the VNFCI install location on the target OS 630 (See FIG. 6) may be checked for a custom script. If a custom script is not located, then a default LCM operation command is constructed which specifies the ID of the module 1222. The VNFM 690 (See FIG. 6) then examines the version of the OS installation 630 (See FIG. 6) determined in step 1208, and based on that plugs in an adaptor which adapts 1224 the command to match the service management framework delivered with the OS installation 630 (See FIG. 6). In one embodiment, that service management framework is Systemd. In another embodiment, the service management framework is Upstart. In some embodiments that use a Windows operating system variant, it is Windows service manager.

Once the command has been adapted for the target, the VNFM 690 (See FIG. 6) starts a response timer and requests that the OS installation running in the VC executes the command 1226. This request is made over the connection previously verified or established in 1210-1212. In some embodiments, the length of the timer is determined by a parameter in the LCM operation request. In some embodiments, the length of the timer is determined by configuration on a per operation basis or with a default value.

In accordance with one or more embodiments of the present application, the command is executed, and a response is returned to the VNFM 690 (See FIG. 6) or a timeout occurs. If the VNFM 690 (See FIG. 6) receives a response 1228 before the timer expires, the timer is stopped, and the response is processed. The result returned indicates whether or not the command executed successfully. It may include the current status of the VNFCI 632 or 634 (See FIG. 6). However, it is expected that a separate VNFCI monitoring process will be used to view any state changes that may occur as a result of the LCM operation. In some embodiments, the VNFCI 632 or 634 (See FIG. 6) is monitored as described in process 1100 (See FIG. 11).

The OS adaptor identified in step 1224 is used to create a normalized result 1230 to be included in the LCM operation response. In one embodiment, the original, non-adapted result is also included in the normalized result. The VNFM 690 (See FIG. 6) then builds a VNFCI LCM response that includes the normalized result and sends it 1232 to the entity that requested the LCM operation in 1202. If the timer expires before a response is returned 1234, then the VNFM 690 (See FIG. 6) builds a VNFCI LCM response that includes the normalized result indicating a timeout and sends it 1232 to the entity that requested the LCM operation in 1202.

In accordance with one or more embodiments of the present application, if the VNFC includes a custom LCM status script 1220, then a script invocation is constructed which specifies the ID of the VNFCI is built 1236. Once built, the VNFM 690 (See FIG. 6) requests that the OS installation 630 (See FIG. 6) running in the VC 606 (See FIG. 6) execute 1238 the script invocation, which specifies the LCM script that was previously installed 954 (See FIG. 9) when the VNF was instantiated 900 (See FIG. 9). In accordance with one or more embodiments of the present application, the script is executed, and a response is returned to the VNFM 690 (See FIG. 6) or a timeout occurs. If the VNFM 690 (See FIG. 6) receives a response 1240 before the timer expires, the timer is stopped, and the response is processed. The result returned indicates whether or not the script executed successfully. It is further expected that the returned result is normalized for inclusion in the notification as the custom script understands the adaptation required.

As before, the VNFM 690 (See FIG. 6) then builds a VNFC LCM response that includes the normalized result and sends it 1232 to the entity that requested the LCM operation in 1202. It may include the current status of the VNFCI 632 or 634 (See FIG. 6). If the timer expires before a response is returned 1234, then the VNFM 690 (See FIG. 6) builds a VNFC LCM response that includes the normalized result indicating a timeout and sends it 1232 to the entity that requested the LCM operation in 1202.

What is claimed is:

1. A method performed by a Virtual Network Function Manager (VNFM) in communication with a virtual network function component instance (VNFCI) comprising a plurality of independently manageable VNFCI modules, the method comprising:
   from a requesting entity, receiving a VNFC Lifecycle Management (LCM) request specifying the VNFCI, an identity of an independently manageable VNFCI module of the plurality of independently manageable VNFCI modules, and an LCM operation to be performed on the independently manageable VNFCI module;
   retrieving a VNFCI entry;
   determining a target OS installation of the VNFCI based on the VNFCI entry;
   establishing a connection to the target OS installation;
   identifying that a VNFC-specific LCM script for the LCM operation to be performed exists;
   constructing a VNFC-specific LCM script invocation that calls the VNFC-specific LCM script and specifies the VNFCI;
   executing the VNFC-specific LCM script invocation by the independently manageable VNFCI module;
   in response to the executing of the VNFC-specific LCM script invocation, receiving a normalized result; and
   sending a response including the normalized result to the requesting entity.

2. The method of claim 1, wherein the requesting entity is one of:
   a network function virtualization orchestrator (NFVO),
   an element management system (EMS), or
   a subsystem of the VNFM.

3. The method of claim 1, wherein the retrieving of the VNFCI entry further comprises:
   retrieving the VNFCI entry from a VNFCI store.

4. The method of claim 1, wherein the VNFCI entry comprises the target OS installation.

5. The method of claim 1, wherein the executing of the VNFC-specific LCM script invocation further comprises:
   starting a response timer wherein a length of the response timer is based on at least one of:
   an LCM request parameter, a configured value, or a default value.

6. The method of claim 1, wherein the establishing the connection to the target OS installation further comprises:
   dynamically setting up a new connection or re-using an existing connection to the target OS installation.

7. The method of claim 1, wherein the response comprises an initial state of the VNFCI after executing the VNFC-specific LCM script invocation.

8. A system, comprising:
   a Virtual Network Function Manager (VNFM) in communication with a virtual network function component instance (VNFCI) comprising a plurality of independently manageable VNFCI modules, the VNFM configured to:
   from a requesting entity, receive a VNFC Lifecycle Management (LCM) request specifying the VNFCI, an identity of an independently manageable VNFCI module of the plurality of independently manageable VNFCI modules, and an LCM operation to be performed on the independently manageable VNFCI module;
   retrieve a VNFCI entry;
   determine a target OS installation of the VNFCI based on the VNFCI entry;
   establish a connection to the target OS installation;
   identify that a VNFC-specific LCM script for the LCM operation to be performed exists;
   construct a VNFC-specific LCM script invocation that calls the VNFC-specific LCM script and specifies the VNFCI;
   execute the VNFC-specific LCM script invocation by the independently manageable VNFCI module;
   in response to the VNFC-specific LCM script invocation being executed, receive a normalized result; and
   send a response including the normalized result to the requesting entity.

9. The system of claim 8, wherein the requesting entity is one of:
   a network function virtualization orchestrator (NFVO),
   an element management system (EMS), or
   a subsystem of the VNFM.

10. The system of claim 8, wherein the VNFCI entry is retrieved from a VNFCI store.

11. The system of claim 8, wherein the one or more VNFCI entry comprises the target OS installation.

12. The system of claim 8, wherein when the VNFM executes the VNFC-specific LCM script invocation, the VNFM is further configured to:
   start of a response timer, wherein a length of the response timer is based on at least one of an LCM request parameter, a configured value, or a default value.

13. The system of claim 8, wherein when the VNFM establishes the connection to the target OS installation, the VNFM is further configured to:
   dynamically set up a new connection or re-using an existing connection to the target OS installation.

14. The system of claim 8, wherein the response comprises an initial state of the VNFCI after executing the VNFC-specific LCM script invocation.

15. A non-transitory computer-readable medium comprising instructions that, when executed by a processor of a Virtual Network Function Manager (VNFM) in communication with a virtual network function component instance (VNFCI) comprising a plurality of independently manageable VNFCI modules, cause the processor to perform:
   from a requesting entity, receiving a VNFC Lifecycle Management (LCM) request specifying the VNFCI, an identity of an independently manageable VNFCI module of the plurality of independently manageable VNFCI modules, and an LCM operation to be performed on the independently manageable VNFCI module;
   retrieving a VNFCI entry;
   determining a target OS installation of the VNFCI based on the VNFCI entry;
   establishing a connection to the target OS installation;
   identifying that a VNFC-specific LCM script for the LCM operation to be performed exists;
   constructing a VNFC-specific LCM script invocation command that calls the VNFC-specific VNFC specific LCM script and which specifies the VNFCI;
   executing the VNFC-specific LCM script invocation by the independently manageable VNFCI module;
   in response to the executing of the VNFC-specific LCM script invocation, receiving a normalized result; and
   sending a response including the normalized result to the requesting entity.

16. The non-transitory computer-readable medium of claim 15, wherein the requesting entity is one of:
   a network function virtualization orchestrator (NFVO),
   an element management system (EMS), or
   a subsystem of the VNFM.

17. The non-transitory computer-readable medium of claim 15, wherein the retrieving of the VNFCI entry further comprises:
   retrieving the VNFCI entry from a VNFCI store.

18. The non-transitory computer-readable medium of claim 15, wherein the VNFCI entry comprises the target OS installation.

19. The non-transitory computer-readable medium of claim 15, wherein the establishing the connection to the target OS installation further comprises:
   dynamically setting up a new connection or re-using an existing connection to the target OS installation.

20. The non-transitory computer-readable medium of claim 15, wherein the response comprises an initial state of the VNFCI after executing the VNFC-specific LCM script invocation.

* * * * *